United States Patent
Shinozaki

(10) Patent No.: US 8,135,428 B2
(45) Date of Patent: Mar. 13, 2012

(54) TRANSMISSION POWER CONTROL TARGET CALCULATING APPARATUS

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 605 days.

(21) Appl. No.: 12/076,714

(22) Filed: Mar. 21, 2008

(65) Prior Publication Data
US 2008/0214230 A1 Sep. 4, 2008

Related U.S. Application Data

(63) Continuation of application No. PCT/JP2005/017414, filed on Sep. 21, 2005.

(51) Int. Cl.
*H04B 7/00* (2006.01)
(52) U.S. Cl. ............... 455/522; 455/69; 370/318
(58) Field of Classification Search ............ 455/69, 455/522; 370/318
See application file for complete search history.

(56) References Cited

U.S. PATENT DOCUMENTS

| | | | |
|---|---|---|---|
| 6,628,631 B1 | 9/2003 | Mazawa et al. | |
| 6,628,924 B1 | 9/2003 | Miyamoto | |
| 7,266,096 B2 | 9/2007 | Miya et al. | |
| 7,292,874 B2 * | 11/2007 | Cave et al. | 455/522 |
| 7,801,548 B2 * | 9/2010 | Koo et al. | 455/522 |
| 2002/0012383 A1 | 1/2002 | Higuchi et al. | |
| 2004/0203993 A1 | 10/2004 | Tanoue | |
| 2006/0084459 A1 * | 4/2006 | Phan et al. | 455/522 |
| 2007/0133423 A1 * | 6/2007 | Okumura | 370/248 |

FOREIGN PATENT DOCUMENTS

| | | |
|---|---|---|
| EP | 1 244 232 | 9/2002 |
| JP | 2000-217139 | 8/2000 |
| JP | 2000-307511 | 11/2000 |
| JP | 2002-016545 | 1/2002 |
| JP | 2002-171557 | 6/2002 |
| JP | 2003-111134 | 4/2003 |
| JP | 2003-153329 A | 5/2003 |
| JP | 2003-318819 | 11/2003 |

OTHER PUBLICATIONS

Japan Patent Office: Japanese Office Action, mailed Oct. 26, 2010, in JP Patent Application No. 2007-536367, with English-language translation.

* cited by examiner

*Primary Examiner* — Raymond Dean
(74) *Attorney, Agent, or Firm* — Fujitsu Patent Center

(57) ABSTRACT

A transmission power control target value calculating apparatus that calculates target values, which are used for transmission power control of radio waves sent through radio transmission paths, comprises: a first target value calculating section that calculates a first transmission power control target value based on quality of combined data which is obtained by combining data obtained through the radio transmission paths; and a second target value calculating section that determines a second transmission power control target value to be applied to at least one of the radio transmission paths, based on the first transmission power control target value and quality information of each of the radio transmission paths.

16 Claims, 27 Drawing Sheets

FIG. 7

| | MESUREMENT CYCLE | | | | | | | | | | RESULT (NUMBER OF x) | DISTRIBUTION RATIO |
|---|---|---|---|---|---|---|---|---|---|---|---|---|
| | 0 | 1 | 2 | 3 | 4 | 5 | 6 | 7 | 8 | 9 | | |
| #0 | ○ | ○ | × | ○ | × | ○ | ○ | × | × | ○ | 4 | 1 |
| #1 | × | × | × | × | × | ○ | × | × | ○ | × | 8 | 2 |

FIG. 12

|  | RECEPTION DATA RATIO | ERROR RATE |
|---|---|---|
| RADIO TRANSMISSION PATH #0 | 1/2 | 0.1 |
| RADIO TRANSMISSION PATH #1 | 1/2 | 0.05 |

FIG. 13

| | ERROR AMOUNT (BIT) | RECEPTION DATA AMOUNT (BIT) | ERROR RATE (ACTUAL MEASUREMENT) | ERROR RATE (TARGET) | TARGET SIR_VIRTUAL |
|---|---|---|---|---|---|
| DATA OBTAINED AFTER DHO | 40 | 2000 | 0.02 | 0.01 | (INCREASE PROCESSING) + |
| | 20 | 2000 | 0.1 | | (NOT EXECUTED) × |
| | 10 | 2000 | 0.005 | | (REDUCTION PROCESSING) − |

FIG. 15

| | ERROR RATE (ACTUAL MEASUREMENT) | ERROR RATE (TARGET) |
|---|---|---|
| RADIO TRANSMISSION PATH #0 | 0.1 | 0.01 |
| RADIO TRANSMISSION PATH #1 | 0.05 | |
| DATA OBTAINED AFTER DHO | 0.02 | |

FIG. 16

| TRANSMISSION PATH | STATE | TARGET SIR_VIRTUAL | CONTROL TARGET |
|---|---|---|---|
| A | LOWER THAN TARGET QUALITY | + | ○ |
| A | LOWER THAN TARGET QUALITY | − | × |
| B | LOWER THAN TARGET QUALITY BUT EQUAL TO OR HIGHER THAN LOWER LIMIT QUALITY | + | ○ |
| B | LOWER THAN TARGET QUALITY BUT EQUAL TO OR HIGHER THAN LOWER LIMIT QUALITY | − | ○ |
| C | EQUAL TO OR HIGHER THAN TARGET QUALITY BUT LOWER THAN UPPER LIMIT QUALITY | + | ○ |
| C | EQUAL TO OR HIGHER THAN TARGET QUALITY BUT LOWER THAN UPPER LIMIT QUALITY | − | ○ |
| D | HIGHER THAN UPPER LIMIT QUALITY | + | × |
| D | HIGHER THAN UPPER LIMIT QUALITY | − | ○ |

FIG. 19

| | TARGET SIR_VIRTUAL | R | TARGET SIR |
|---|---|---|---|
| RADIO TRANSMISSION PATH #0 | 10 (dB) | 3 | 6 (dB) |
| RADIO TRANSMISSION PATH #1 | | 2 | 4 (dB) |

FIG. 20

| | TARGET SIR_VIRTUAL | TARGET SIR (NOW) | R | TARGET SIR (NEW) |
|---|---|---|---|---|
| RADIO TRANSMISSION PATH #0 | 5 (dB) | 8 | 3 | 11 (dB) |
| RADIO TRANSMISSION PATH #1 | | 6 | 2 | 8 (dB) |

FIG. 25

| | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | \multicolumn{15}{c}{SUB CARRIERS} | | | | | | | | | | | | | | |
| FADING | BRANCH #0 | | | | | | | | | | | ○ | | ○ | | |
| | BRANCH #1 | | ○ | | | ○ | | | | | | | | | | |
| ASSIGN-MENT | BRANCH #0 | | | | | | | | | ▓ | ▓ | ▓ | ▓ | ▓ | ▓ | ▓ |
| | BRANCH #1 | ▓ | ▓ | ▓ | ▓ | ▓ | ▓ | ▓ | | | | | | | | |

TRANSMISSION POWER CONTROL TARGET CALCULATING APPARATUS

CROSS-REFERENCE TO RELATED APPLICATION

This is a continuation of Application PCT/JP2005/017414, filed on Sep. 21, 2005, now pending, the contents of which are herein wholly incorporated by reference.

BACKGROUND

It relates to an outer loop transmission power control method used in mobile communication systems, and to calculation of a transmission power control target value.

In conventional mobile communication systems such as 3GPP systems, inner loop transmission power control and outer loop transmission power control are performed as transmission power control of radio waves traveling in a direction (uplink direction) from a mobile terminal (mobile station (MS) or user equipment (UE)) to a base station (base transceiver station (BTS) or node B).

In the inner loop transmission power control, the following operation is generally performed. For example, the base station measures a signal-to-interference ratio (SIR: target-received-wave-to-interference-wave ratio) of uplink-direction radio waves received from the mobile terminal, and compares the measured value with a predetermined value as a target SIR. Based on the comparison result, the base station determines to increase or reduce transmission power of radio waves to be transmitted by the mobile terminal, and sends power control information (called a transmission power control (TPC) command) indicating an increase or reduction in transmission power, to the mobile station. For example, when the measured SIR is lower than the target SIR, a TPC command indicating an increase in transmission power is sent. The mobile station sends, to the base station, radio waves with the transmission power controlled based on the TPC command. A feedback loop formed between the base station and the mobile station in this way is called an inner loop.

On the other hand, in the outer loop transmission power control, the target SIR to be used for the above-described inner loop transmission power control is controlled. For example, a base station control apparatus (base station controller (BSC) or radio network controller (RNC)) which accommodates the base station, which performs the inner loop transmission power control, obtains information (data) acquired from radio waves received by the base station, from the base station, and determines the quality of the data. At this time, when the quality does not reach the target quality, the base station control apparatus determines a target SIR so as to improve the quality, and notifies the target SIR to the base station. A feedback loop formed between the base station and the base station control apparatus in this way is called an outer loop.

As described above, in the outer loop transmission power control, the target SIR, which is one of parameters for uplink data sent from the mobile terminal, is controlled. The target SIR indicates the target reception quality of data to be received by the base station from the mobile terminal. When data sent from the mobile terminal is received by the base station control apparatus through the base station, quality information of the radio section is attached on the data. The base station control apparatus measures the quality of the data based on the quality information for a given period of time. When the given period of time has elapsed, the base station control apparatus calculates an uplink-direction target SIR to be used in the inner loop, based on measurement results. When the calculated target SIR is different from the last target SIR which has been specified in the base station, the base station control apparatus notifies the target SIR calculated this time to the base station. The base station updates the target SIR.

Diversity hand over (DHO) among base stations in the currently-used 3GPP systems (third generation mobile communication systems) is realized by the use of multiple radio transmission paths, and selection/compounding and multiple distributing performed in the mobile terminal and the base station control apparatus.

For example, as shown in FIG. 1, it is assumed that DHO is performed between the mobile terminal (UE) and the base station control apparatus (RNC) through three base stations (three node B). When data transmission and reception are performed in a downlink direction (RNC to UE), the RNC sends identical data to the base stations through interfaces Iub. The base stations modulate the data by using different spreading code, and send the modulated data to the UE through different radio-section interfaces Uu (radio transmission paths). Among the pieces of data sent from the base stations, the UE selects data having good radio transmission path quality (data arrived without an error) and receives the selected data. On the other hand, when data transmission and reception are performed in an uplink direction (UE to RNC), the UE sends identical data to the base stations. The base stations send the data received from the UE, to the RNC. The RNC selects data having good radio transmission path quality among the pieces of data received from the base stations, or collects parts of the data having good quality from the pieces of data received from the base stations and compounds the parts. With this method, a diversity effect can be obtained between the UE and the RNC.

In the above-described systems, identical data is sent to the multiple radio transmission paths. Therefore, when the number of radio transmission paths is increased, the available radio capacity is reduced.

Further, the pieces of data (signals) sent from the base stations to the mobile terminal through the radio transmission paths are modulated by using the different spreading codes. Therefore, when the mobile terminal demodulates a signal sent through a certain radio transmission path by inverse-spreading, noise is produced in a signal sent through another radio transmission path (see FIG. 2). Therefore, each of the base stations needs to increase the transmission power in order to assure the desired SIR.

Further, in the above-described diversity reception system employed in the RNC, it is necessary to receive data with no error from at least one of the multiple radio transmission paths in order to select and combine pieces of data sent from multiple base stations. For this reason, a minimum target SIR for obtaining the diversity effect is specified in each base station.

As described above, there is a problem in that when DHO is performed among base stations in conventional 3GPP systems, the available radio capacity (radio resources) or transmission power cannot be efficiently used.

As a technology of avoiding the problem regarding the use of radio resources, for example, Patent Document 1 discloses a radio communication system and a handoff method therefor. In the radio communication system, handoff means is provided which maintains a consistent amount of used downlink radio resources in a radio base station regardless of whether a handoff is being made or not.

Patent Document 1: JP 2000-217139 A

SUMMARY

An object of an aspect is to provide a technology of calculating, when data transmission and reception are performed using multiple radio transmission paths in a mobile communication system, a transmission power control target value for each of the radio transmission paths to perform efficient transmission power control.

In order to solve the above-mentioned problems, an aspect employs the following configurations.

That is, the aspect relates to a transmission power control target value calculating apparatus that calculates target values, which are used for transmission power control of radio waves sent through radio transmission paths, including: a first target value calculating section that calculates a first transmission power control target value based on quality of combined data which is obtained by combining data obtained through the radio transmission paths; and a second target value calculating section that determines a second transmission power control target value to be applied to at least one of the radio transmission paths, based on the first transmission power control target value and quality information of each of the radio transmission paths.

The second target value calculating section according to the aspect is preferably configured to hold target quality, compare the quality information of each of the multiple radio transmission paths with the target quality when a value indicating the first transmission power control target value is notified from the first target value calculating section, and exclude, when the value indicating the first transmission power control target value indicates an increase in the transmission power, a radio transmission path whose quality information is higher than the target quality, from targets for each of which the second transmission power control target value is to be calculated.

Further, the second target value calculating section according to the aspect is preferably configured to hold target quality, compare the quality information of each of the multiple radio transmission paths with the target quality when a value indicating the first transmission power control target value is notified from the first target value calculating section, and exclude, when the value indicating the first transmission power control target value indicates a reduction in the transmission power, a radio transmission path whose quality information is lower than the target quality, from targets for each of which the second transmission power control target value is to be calculated.

Further, the second target value calculating section according to the aspect is preferably configured to hold target quality and an upper limit quality value, compare the quality information of each of the multiple radio transmission paths with the target quality and the upper limit quality value when a value indicating the first transmission power control target value is received from the first target value calculating section, and exclude, when the value indicating the first transmission power control target value indicates an increase in the transmission power, a radio transmission path whose quality information is higher than the target quality and the upper limit quality value from targets for each of which the second transmission power control target value is to be calculated.

Further, the second target value calculating section according to the aspect is preferably configured to hold target quality and a lower limit quality value, compare the quality information of each of the multiple radio transmission paths with the target quality and the lower limit quality value when a value indicating the first transmission power control target value is received from the first target value calculating section, and exclude, when the value indicating the first transmission power control target value indicates a reduction in the transmission power, a radio transmission path whose quality information is lower than the target quality and the lower limit quality value from targets for each of which the second target value is to be calculated.

Further, the second target value calculating section according to the aspect is preferably configured to: compare the quality of the combined data with the quality information of each of the radio transmission paths when a notification is received from the first target value calculating section; exclude a radio transmission path whose quality information indicates the same value as the quality of the combined data, from targets for each of which the second target value is to be calculated; and calculate a new second transmission power control target value which is obtained by increasing or reducing, by a predetermined amount, the second transmission power control target value that is currently used for the transmission power control, for at least one of radio transmission paths whose quality information does not indicate the same value as the quality of the combined data.

Further, the second target value calculating section according to the aspect is preferably configured to determine, when a value indicating the first transmission power control target value is notified from the first target value calculating section, based on the quality information of each radio transmission path that is a target for which the second transmission power control target value is to be calculated, an allocation amount of the value indicating the first transmission power control target value to the target radio transmission paths.

Further, the second target value calculating section according to the aspect is preferably configured to calculate a weight $R$ ($0 \leq R \leq 1$) for the target radio transmission path based on the quality information of the target radio transmission path, and multiply the value indicating the first transmission power control target value by the weight $R$ to determine the allocation amount of the value indicating the first transmission power control target value to the target radio transmission path.

According to the aspect, the value indicating the first transmission power control target value is the first transmission power control target value, and the second target value calculating section is configured to calculate the allocation amount of the first transmission power control target value to the target radio transmission path, as the second transmission power control target value to be applied to the target radio transmission path.

Further, according to the aspect: the first target value calculating section is preferably configured to calculate the first transmission power control target value at intervals of a predetermined measurement cycle; the value indicating the first transmission power control target value is preferably a difference value between a first transmission power control target value calculated in the preceding measurement cycle and a first transmission power control target value calculated in the current measurement cycle; and the second target value calculating section is preferably configured to calculate an allocation amount of the difference value to the target radio transmission path, as an update amount of the second transmission power control target value currently used for the target radio transmission path.

Further, another aspect relate to a transmission power control target value calculating method performed by an information processor that calculates target values, which are used for transmission power control of radio waves sent through radio transmission paths, the method including: calculating a first transmission power control target value based on quality of combined data which is obtained by combining data obtained through the multiple radio transmission paths; and determining a second transmission power control target value to be applied to at least one of the radio transmission paths, based on the first transmission power control target value and quality information on each of the radio transmission paths.

Further, other aspects can be identified as a program for causing an information processor to function as the above-mentioned transmission power control target value calculating apparatus, or a recording medium in which the program is recorded.

According to the aspect, when data transmission and reception are performed using multiple radio transmission paths in a mobile communication system, it is possible to calculate a transmission power target value for each of the radio transmission paths so as to perform efficient transmission power control.

BRIEF DESCRIPTION OF THE DRAWINGS

FIG. 7 is an explanatory diagram of a data distribution ratio determining method.

FIG. 12 is a diagram showing an example of transmission path quality relevant information collected by the quality measuring section.

FIG. 13 is a diagram showing an example of processing performed by a target SIR_virtual calculating section shown in FIG. 10.

FIG. 15 is a diagram showing example of error rates to be compared in a system (System B) of determining a control target transmission path based on a result of comparison between final target quality and radio transmission path quality.

FIG. 16 is an explanatory diagram of a method (method 2) in which upper and lower limit values of the quality, and the target quality are prepared for radio transmission paths as determination parameters, so as to determine whether each radio transmission path is set to a control target.

FIG. 19 is a diagram showing an example in which a target SIR for each radio transmission path is calculated from a target SIR_virtual.

FIG. 20 is a diagram showing an example (operation mode 1) in which a target SIR for each radio transmission path is calculated from a difference value in target SIR_virtual.

FIG. 25 is a diagram showing an example of fading occurrence states of multiple sub carriers to be used by radio transmission paths and states of reception available sub carriers assigned to the radio transmission paths.

DESCRIPTION OF SYMBOLS

Figure 1:
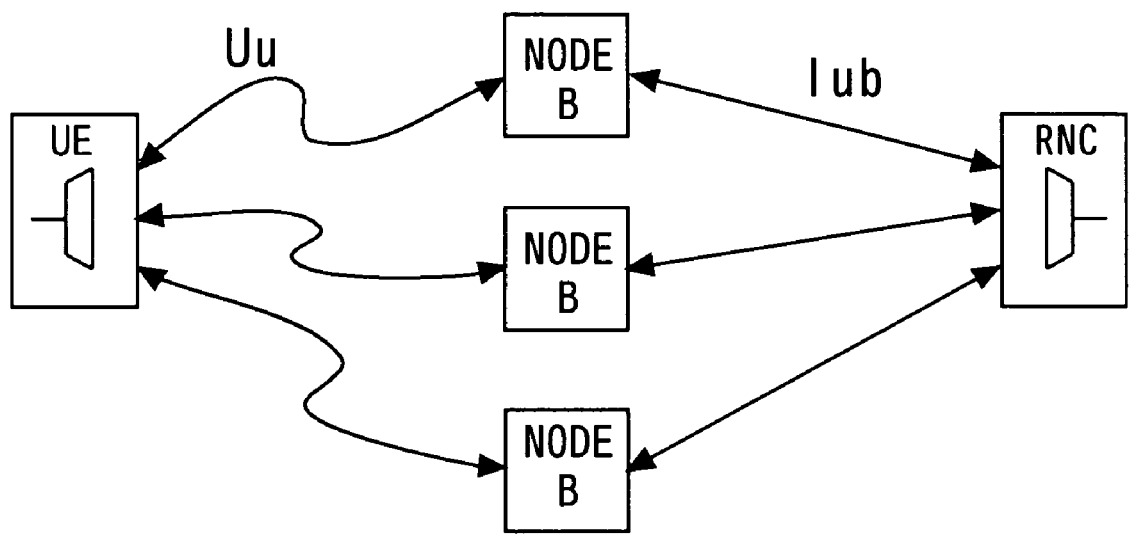
FIG. 1 is an explanatory diagram of DHO performed among base stations.
Figure 2:
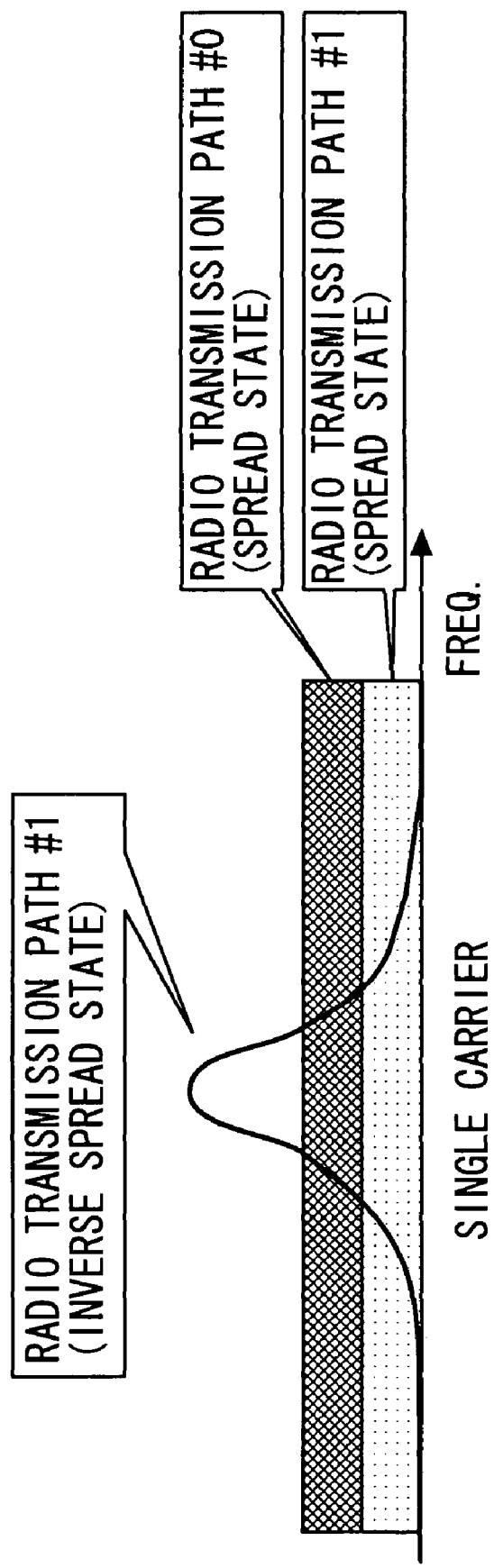
FIG. 2 is an explanatory diagram of SIR deterioration.

10 . . . transmission and reception processing section
20 . . . DHO executing section
30 . . . outer loop transmission power control section (outer loop executing section)
31 . . . quality measuring section
32 . . . target SIR_virtual calculating section
33 . . . target SIR calculating section
34 . . . outer loop P.C. frame generating section
35 . . . control section

DETAILED DESCRIPTION OF THE EMBODIMENT

Hereinafter, an embodiment of the present invention will be described with reference to the drawings. A configuration of the embodiment is an example, and the aspect of the present invention is not limited to the configuration of the embodiment.

<Outline of the Present Invention>

Figure 3:
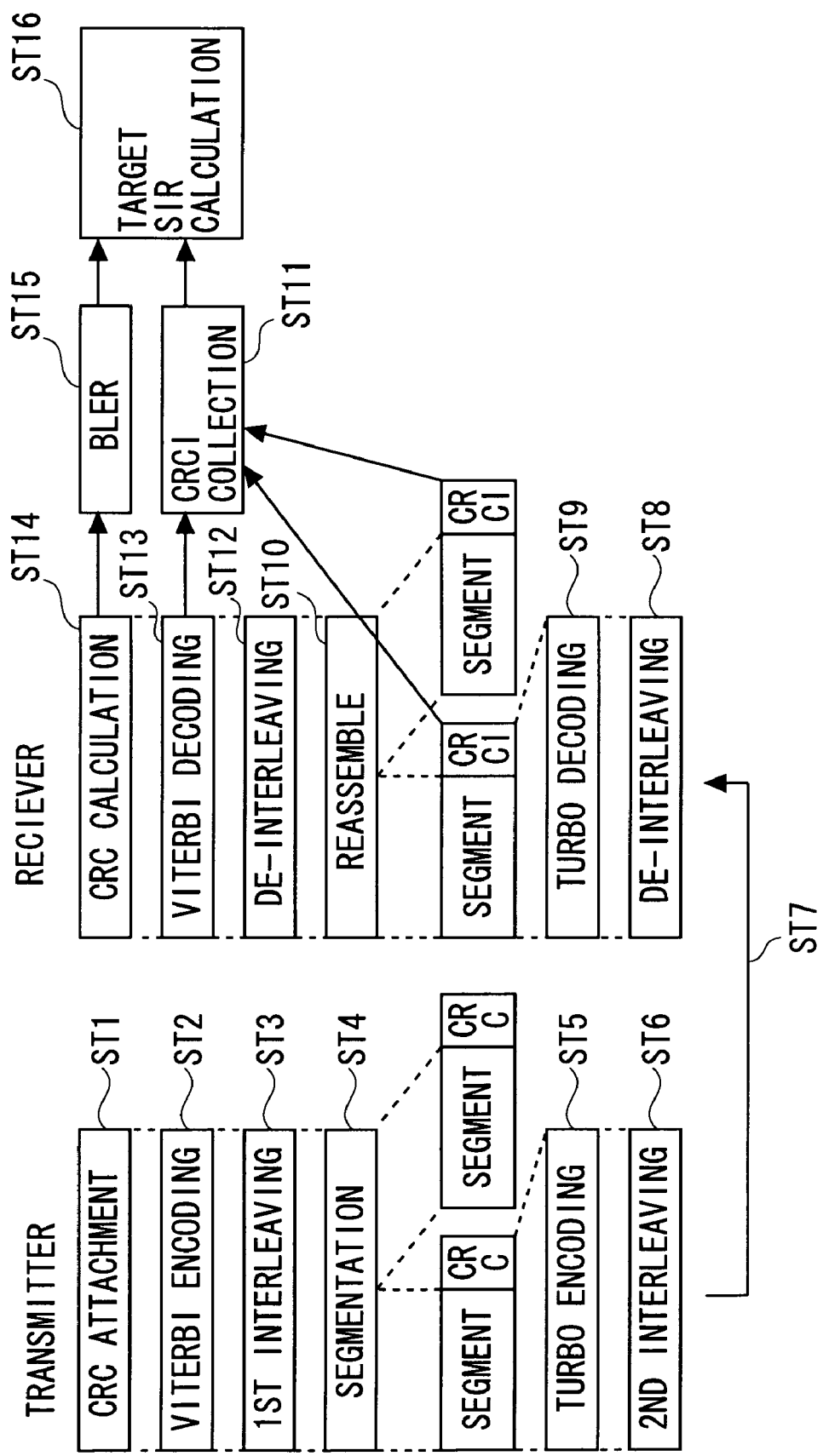
FIG. 3 is a conceptual diagram showing an example of a basic configuration according to an embodiment.

First, a mobile communication system to which the present an embodiment is suitably applied will be described. FIG. 3 is a conceptual diagram showing an example of a basic configuration according to the embodiment. FIG. 3 shows processing performed by a data transmitter and a data receiver included in the mobile communication system. The transmitter and the receiver are separated by a radio section. In the radio section, multiple radio transmission paths (branches) are prepared.

In FIG. 3, in the transmitter, cyclic redundancy check (CRC) data used for data normality verification is attached to transmission target data (data block) (ST1).

Next, error-correction encoding processing (for example, Viterbi encoding) is applied to the data block to which the CRC data has been attached (ST2). Next, first interleaving processing is applied to the data block (ST3).

Next, the data block is divided into the same number of segments (division data blocks) as the number of the multiple radio transmission paths (branches) prepared in the radio section between the transmitter and receiver (ST4). At this time, the CRC data is attached to each of the segments.

Next, error-correction encoding processing (for example, turbo encoding) is applied to the segments (ST5), and second interleaving is further applied thereto (ST6). Thereafter, the segments are converted into radio signals, and the radio signals are sent to the receiver through the radio transmission paths (ST7).

The receiver performs demodulation processing of the radio signals received through the radio transmission paths and obtains the multiple segments. The de-interleaving processing is applied to the segments (ST8). Then, error-correction decoding processing (turbo decoding) is applied thereto (ST9).

Next, the receiver removes the CRC data attached to the segments to which error-correction decoding has been applied, and performs reassemble processing (ST10). Specifically, the segments sent through the multiple radio transmission paths are combined to obtain a combined data block.

At the time of the data reassembling, CRC check (CRC calculation) of each of the segments is performed using the CRC data. Data (CRCI: OK or NG) indicating the CRC check result is collected as quality information of each of the radio transmission paths (ST11).

Further, de-interleaving processing is applied to the combined data block (ST12). Then, error-correction decoding processing (Viterbi decoding) is applied thereto (ST13). As a result, the transmission target data block and the CRC data are reproduced.

At this time, CRC check (CRC calculation) of the reproduced data block is performed (ST14). The CRC check result (OK or NG) is obtained as block error information (BLER) indicating quality of all the radio transmission paths (ST15). Then, a target SIR is calculated based on the CRCI of each of the segments and the BLER of the combined data (ST16).

In the above-described processing, after the error-correction encoding processing (ST2) and the interleaving processing (ST3) are applied, the transmission target data is divided into the same number of segments as the number of radio transmission paths, and the segments are sent through the radio transmission paths (ST7). Accordingly, the amount of data to be sent through the multiple radio transmission paths is reduced, compared with a case where identical data is sent through the multiple radio transmission paths (conventional DHO processing). Therefore, radio resources can be efficiently used.

Further, different pieces of data are sent through the radio transmission paths, so data (radio signal) sent through a certain radio transmission path can be prevented from causing noise in data (radio signal) sent through another radio transmission path. As a result, the transmission power of a radio signal can be reduced.

Further, according to the above-described configuration, even when an error occurred in the radio section cannot be completely removed from the data (segment) sent through the radio transmission paths by the error-correction decoding processing (ST9), it is sufficient that the error is removed by the final error-correction decoding processing (ST13) performed after diversity combining (ST10).

The transmission target data block is interleaved by the interleaving processing (ST3) and then, divided into segments. Therefore, even when an error occurs through a certain radio transmission path, a part that includes the error is spread by the de-interleaving processing (ST12) performed in the receiver. Therefore, the error can be properly removed by the error-correction decoding processing (ST13), which follows the de-interleaving processing (ST12).

Figure 4:
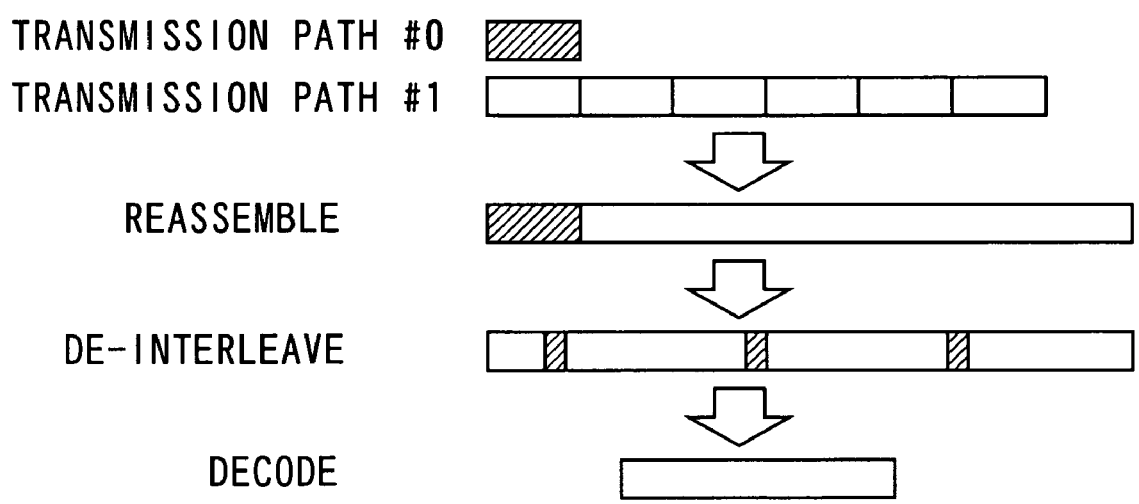
FIG. 4 is an explanatory diagram of an error removal operation performed in a receiver shown in FIG. 3.

FIG. 4 is a diagram showing an example of the above-described operation (error removal operation) performed in the receiver. FIG. 4 shows an example in which a data block is segmented in the proportion of 1 to 6 for two radio transmission paths #0 and #1.

It is assumed that the radio transmission path #0 has a poor condition and an error has occurred in the segment sent through the radio transmission path #0. In this case, the two data blocks are combined by the reassemble processing (ST10) performed in the receiver. Thereafter, the segment which has been sent through the radio transmission path #0 is spread in the combined data block by the de-interleaving processing (ST12). Accordingly, the segment having the error is divided into smaller parts and the error included in the parts is removed by the error-correction decoding processing (ST13).

A data block transmission ratio (data division ratio) of the radio transmission paths is determined based on the quality states of the radio transmission paths. Specifically, the data transmission rate of each of the radio transmission paths is determined so as to provide the data transmission ratio corresponding to the radio quality states.

Therefore, for example, even if a certain radio transmission path has a high error rate, when a low data transmission rate is determined for the radio transmission path, the error amount is suppressed in the entire data block. At this time, when a radio transmission path different from the certain radio transmission path has good quality and a high data transmission rate is determined for this radio transmission path, an error that has occurred in the certain radio transmission path can be corrected by the error-correction decoding processing (ST13) performed after diversity combining. Therefore, the SIR required for each radio transmission path only needs to be specified to a value at which an error can be removed by the error-correction decoding processing (ST13).

In the example of FIG. 3, the configuration (ST16) is shown, in which the target SIR is calculated based on the quality information of each of the radio transmission paths, which is obtained in Step ST11, and the quality information of the data, which is obtained in Step ST15. This processing is a feature of the embodiment of the present invention.

In this embodiment, in the DHO method in which transmission target data is divided and division data is sent to each radio transmission path, a method of comparing radio transmission path quality states of the radio transmission paths based on radio quality information of data received when DHO is performed, and performing the outer loop transmission power control for each of the radio transmission paths based on the comparison result, and a configuration implementing the method will be described.

The transmitter shown in FIG. 3 is configured, for example, by a base station control apparatus and base stations when data is sent in a downlink direction (the base stations to a mobile terminal) in the radio communication system. In this case, the receiver is configured by the mobile terminal. The processings of ST1 to ST4 shown in FIG. 3 are performed in the base station control apparatus, and the processings of ST5 to ST7 are performed in the respective base stations corresponding to the radio transmission paths. At this time, the attachment of CRC data to the segments can be performed either in the base station control apparatus or in the base stations.

On the other hand, when data is sent in an uplink direction (the mobile terminal to the base stations) in the radio communication system, the transmitter is configured by the mobile terminal, and the receiver is configured by the base stations and the base station control apparatus, for example. In this case, for example, the processings of ST8 and ST9 are performed in the respective base stations, and the processings of ST10 to ST16 are performed in the base station control apparatus.

Figure 5:
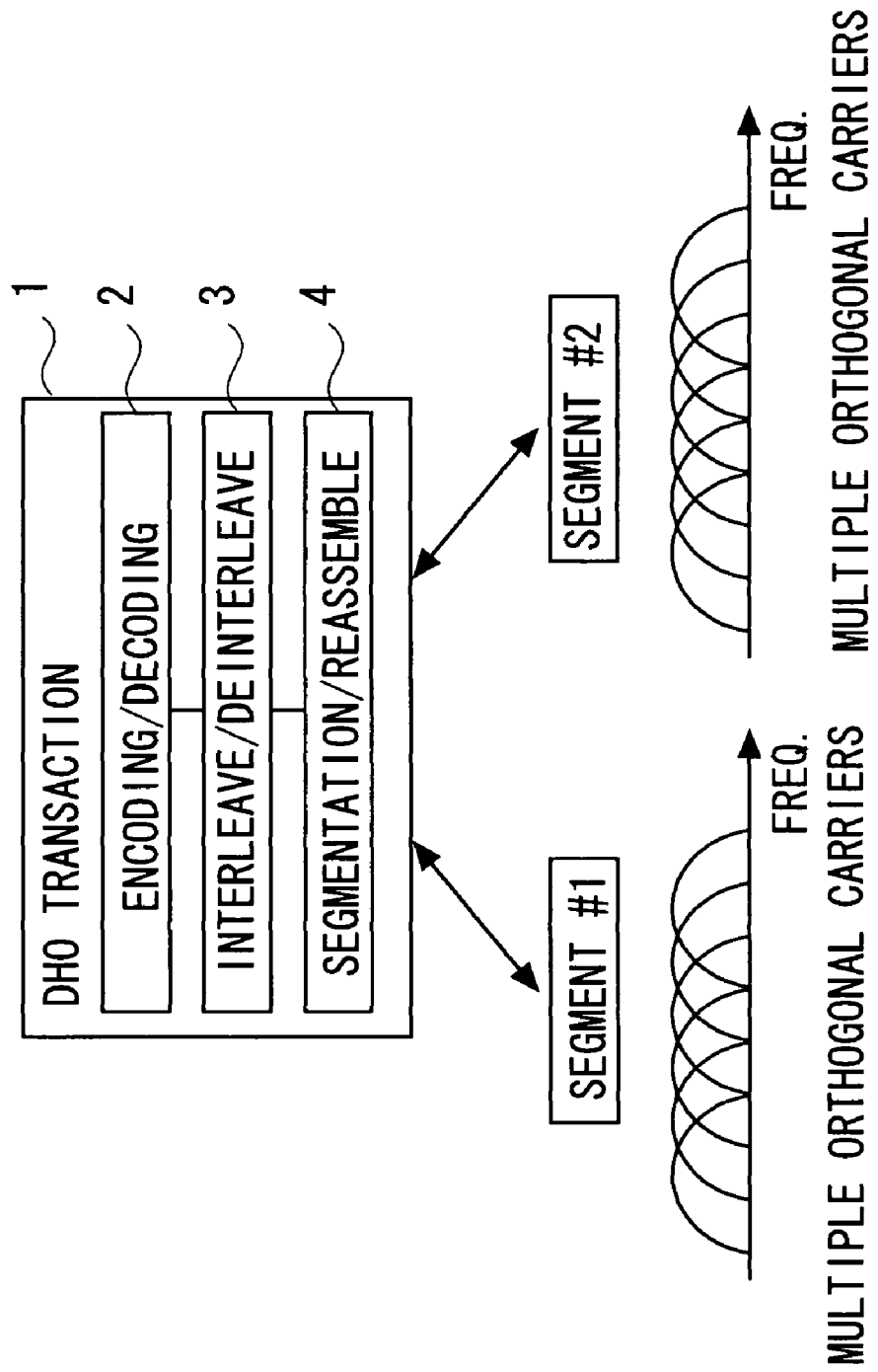
FIG. 5 is a diagram showing a conceptual configuration of a DHO executing section (DHO transaction) which can be implemented in a transmitter and the receiver, which are shown in FIG. 3.
Figure 6:
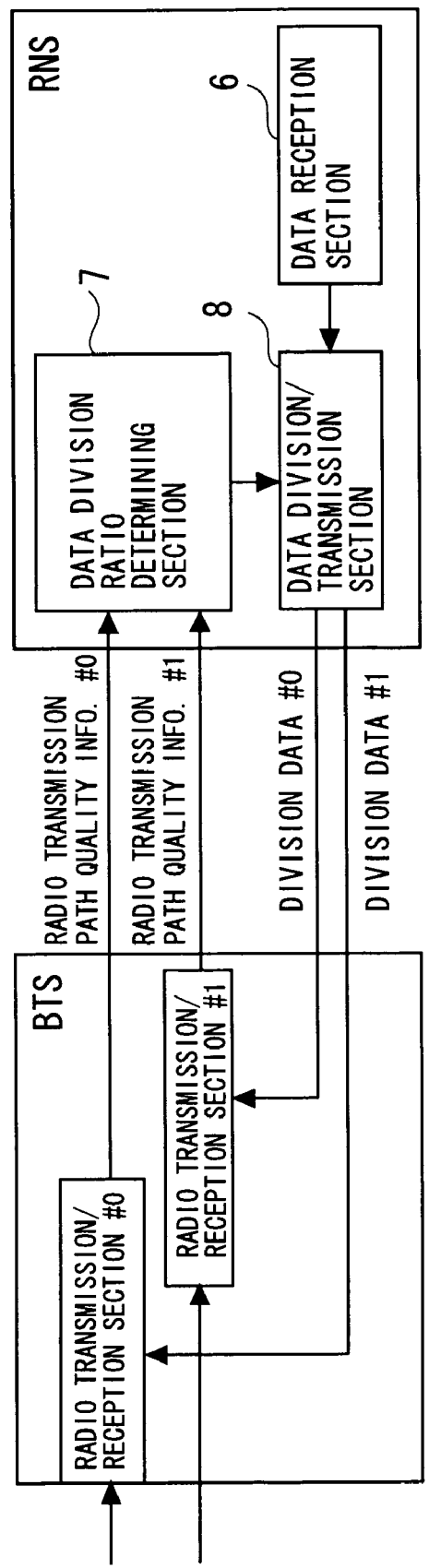
FIG. 6 is a diagram showing a configuration example used to determine a data transmission ratio (data distribution ratio).

FIG. 5 is a diagram showing a conceptual configuration of a DHO executing section (DHO transaction) which can be implemented in the transmitter and the receiver shown in FIG. 3. FIG. 6 is a diagram showing an example of a configuration used to determine a data transmission ratio (data distribution ratio). FIG. 7 is an explanatory diagram of a data distribution ratio determining method.

In FIG. 5, a DHO executing section 1 has a coding/decoding section 2 serving as error-correction encoding means, an interleave/de-interleave section 3 serving as interleave means, and a segmentation (division)/reassemble section 4 serving as division means.

When the DHO executing section 1 functions as a part of the transmitter, the CRC data is attached to transmission target data (data block) in the DHO executing section 1. The coding/decoding section 2 performs the error-correction encoding processing (ST2). The interleave/de-interleave section 3 performs the first interleaving processing (ST3). The division/reassemble section 4 divides the data block into multiple segments (ST4) and outputs the multiple segments. In the example of FIG. 4, the data block is divided into two segments #0 and #1 corresponding to the number of radio transmission paths.

Then, the attachment of the CRC data to the segments and the turbo encoding (ST5), and the second interleaving (ST6) are performed. The segments are converted into radio signals and the radio signals are sent to the receiver through the radio transmission paths (ST7). At this time, as shown in FIG. 5, the segments can be converted into radio signals each having multiple orthogonal carriers as in a multicarrier communication system such as an OFCDM or OFDM system, and sent to the receiver. A single carrier may be used for the radio signals.

On the other hand, when the DHO executing section 1 functions as a part of the receiver, multiple segments which have been obtained by demodulating radio signals are sent to the DHO executing section 1. Then, the division/reassemble section 4 reassembles the segments (ST10). Next, the interleave/de-interleave section 3 applies the de-interleaving processing to the reassembled data block (combined data block) (ST12). Then, the coding/decoding section 2 applies the error-correction decoding processing to the combined data block (ST13).

The DHO executing section 1 can be provided for any of the base station control apparatus, an upper-level device of the base station control apparatus, the base stations, and the mobile terminal, for example.

FIG. 6 shows an example of the configuration used to determine the data division ratio, in a case where the data transmitter is configured by the base station (BTS) and the base station control apparatus (RNC), when data from the RNC is sent from the BTS through the two radio transmission paths #0 and #1. In FIG. 6, it is assumed that the DHO executing section 1 shown in FIG. 5 is implemented in the RNC.

In FIG. 6, the RNC includes a data reception section 6 which receives transmission target data that is sent from the upper-level device and destined for the mobile terminal, a data division ratio determining section 7 which determines the division ratio of the transmission target data based on radio transmission path quality information, a data division/transmission section 8 which divides the transmission target data according to the division ratio and sends division data (segments) to radio transmission and reception sections #0 and #1. At this time, the DHO executing section 1 is included in the data division/transmission section 8.

The radio transmission and reception sections #0 and #1 of the BTS send, to the RNC, radio transmission path quality information #0 and #1 on their radio transmission paths (branches), respectively. The radio transmission path quality information #0 and #1 are given to the data division ratio determining section 7.

The data division ratio determining section 7 calculates the division ratio (data transmission ratio) of a data block based on the radio transmission path quality information #0 and #1, and sends the division ratio to the data division/transmission section 8. When a transmission target data block is received from the data reception section, the data division/transmission section 8 divides the data block according to the division ratio and sends division data (segments) to the radio transmission and reception sections #0 and #1. The radio transmission and reception sections #0 and #1 send radio signals corresponding to the division data to the radio transmission paths.

Note that multiple BTSs corresponding to the number of radio transmission paths #0 and #1 may be prepared, instead of the configuration shown in FIG. 6. Specifically, the correspondence relation of a radio transmission path and a base station may be a one-to-one relation, or an N-to-one relation (where N is a natural number).

As the above-mentioned radio transmission path quality information, TPC information serving as control information used for the inner loop transmission power control performed between the base stations and the mobile terminal can be used, for example. The data division ratio determining section 7 determines a data division ratio based on the TPC information sent through the radio transmission paths.

According to the inner loop transmission power control, the mobile terminal instructs the base station to increase or reduce transmission power. An instruction to increase or reduce transmission power indicates the current radio condition itself. The data division ratio determining section 7 obtains, from the BTS, the TPC information for all the radio transmission paths.

The data division ratio determining section 7 accumulates the TPC information for all the radio transmission paths for a predetermined measurement cycle of time and determines the data division ratio from the results. The TPC information specifies an increase (UP) or a reduction (DOWN) in transmission power.

Specifically, as shown in an example of FIG. 7, instructions specified with the TPC information for the radio transmission paths are accumulated for the predetermined measurement cycle of time. In this example, for one measurement cycle of time, ten instructions are accumulated. The data division ratio determining section 7 adds up the number of reduction instructions issued in the measurement cycle of time, for each radio transmission path.

In FIG. 7, increase instructions are expressed by o and reduction instructions are expressed by x. The number of reduction instructions for the radio transmission path #0 is four, and the number of reduction instructions for the radio transmission path #1 is eight. Therefore, the ratio of reduction instructions between the radio transmission paths is 4:8, that is, 1:2. This ratio is determined as the data division ratio for the radio transmission paths #0 and #1.

Accordingly, in the example shown in FIG. 7, the data block sent from the data reception section 6 is divided in the data division/transmission section 8 according to a ratio of 1:2 for the radio transmission paths #0 and #1, and obtained division data (segments) is sent.

Note that the processings of ST1 to ST10 and ST12 to ST14 shown in FIG. 3 and the processings and the example configurations shown in FIGS. 4 to 7 are disclosed in a patent application titled "communication system and communication method" (International application number PCT/JP2005/04133, International filing date Mar. 9, 2005: Not published) which has already been filed by the inventors of the present application.

The embodiment can be applied to a conventional 3GPP system in which DHO is performed as shown in FIG. 1.

<Outer Loop Transmission Power Control>

An outer loop transmission power control method suitably applied to the above-described mobile communication system will be described below in detail. The outer loop transmission power control method according to this embodiment has the following feature.

Specifically, a target SIR to be specified for each radio transmission path is calculated based on: a virtual target SIR (target SIR_virtual) calculated based on the quality of data received in the DHO executing section; and radio quality information or information on a radio quality state either of which is attached to data received through each radio transmission path.

System Configuration Example

A function (referred to as outer loop transmission power control section (outer loop executing section)) related to the feature is implemented in the DHO executing section, for example. Accordingly, the outer loop executing section is implemented in a device where the DHO executing section is implemented. In 3GPP systems, the RNC includes the DHO executing section, so the outer loop executing section is implemented in the RNC. However, when the DHO executing section is implemented in the base station, the upper-level device of the base station control apparatus, or the mobile terminal, the outer loop executing section can also be implemented in any of those devices.

Figure 8:
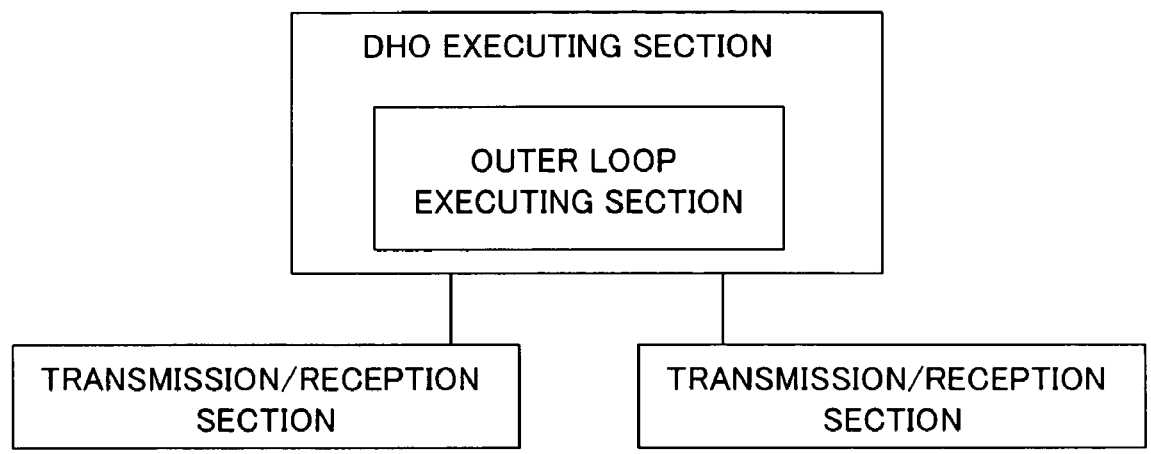
FIG. 8 is a conceptual configuration diagram showing an example of implementation of an outer loop executing section.

FIG. 8 is a conceptual configuration diagram showing an example of implementation of the outer loop executing section. As shown in FIG. 8, the outer loop executing section can be implemented in the DHO executing section. The DHO executing section is connected to transmission and reception sections corresponding to multiple radio transmission paths. Note that the outer loop executing section may be independent of the DHO executing section and cooperate with the DHO executing section.

Figure 9:
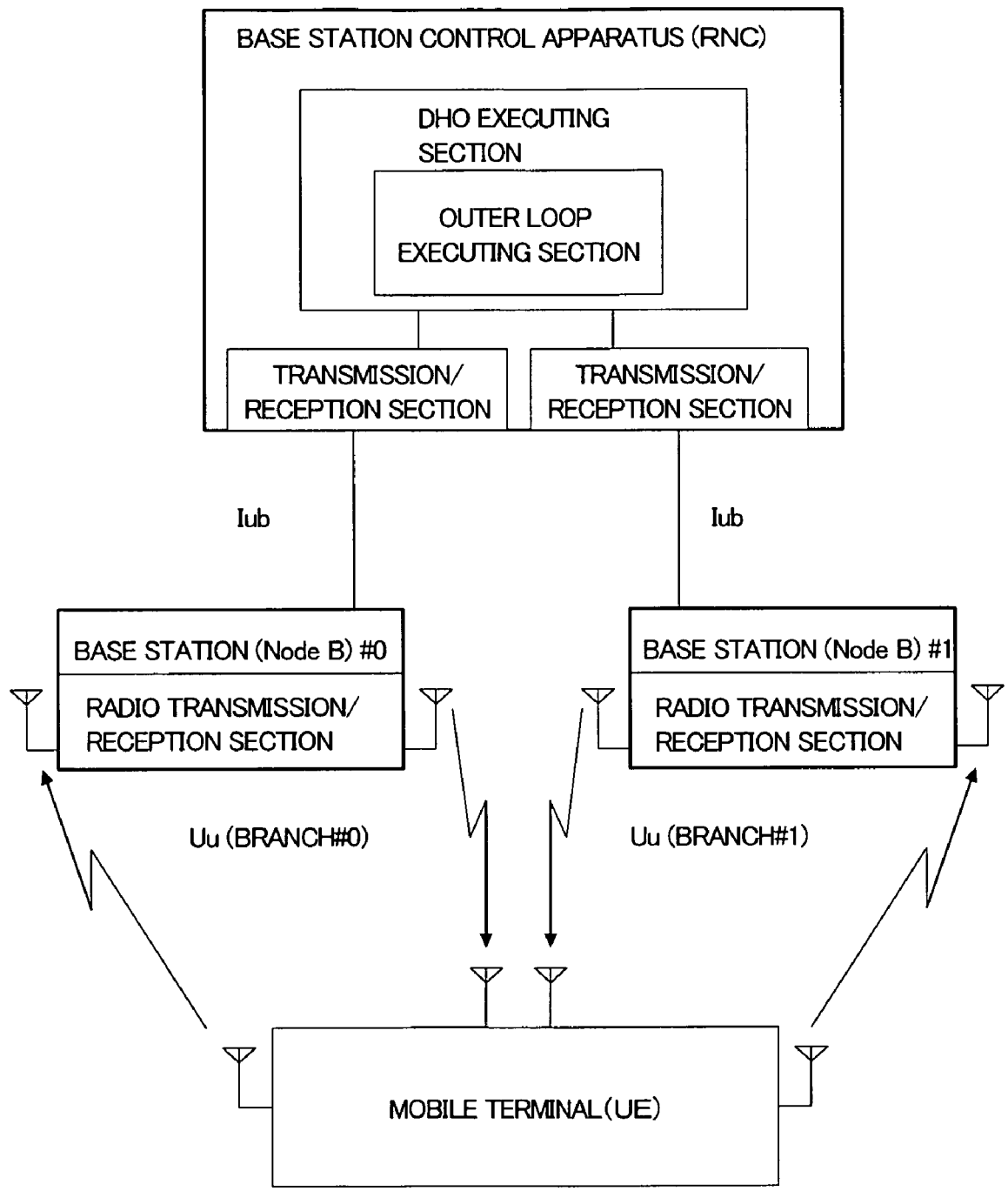
FIG. 9 is a diagram showing an example of a mobile communication system obtained when the DHO executing section which includes the outer loop executing section is implemented in a base station control apparatus (RNC).

FIG. 9 shows an example of a mobile communication system obtained when the DHO executing section which includes the outer loop executing section is implemented in the base station control apparatus (RNC). In the example shown in FIG. 9, the RNC is connected to multiple base stations (Nodes B) via interfaces Iub. Each of the base stations has a radio transmission and reception section to perform radio communication with the mobile terminal (UE). Between the base stations and the mobile terminal, multiple radio transmission paths for which DHO is performed are established. In the example shown in FIG. 9, two radio transmission paths (branches) #0 and #1 are established in each of both uplink and downlink directions.

<<Configuration of Outer Loop Executing Section>>

Figure 10:
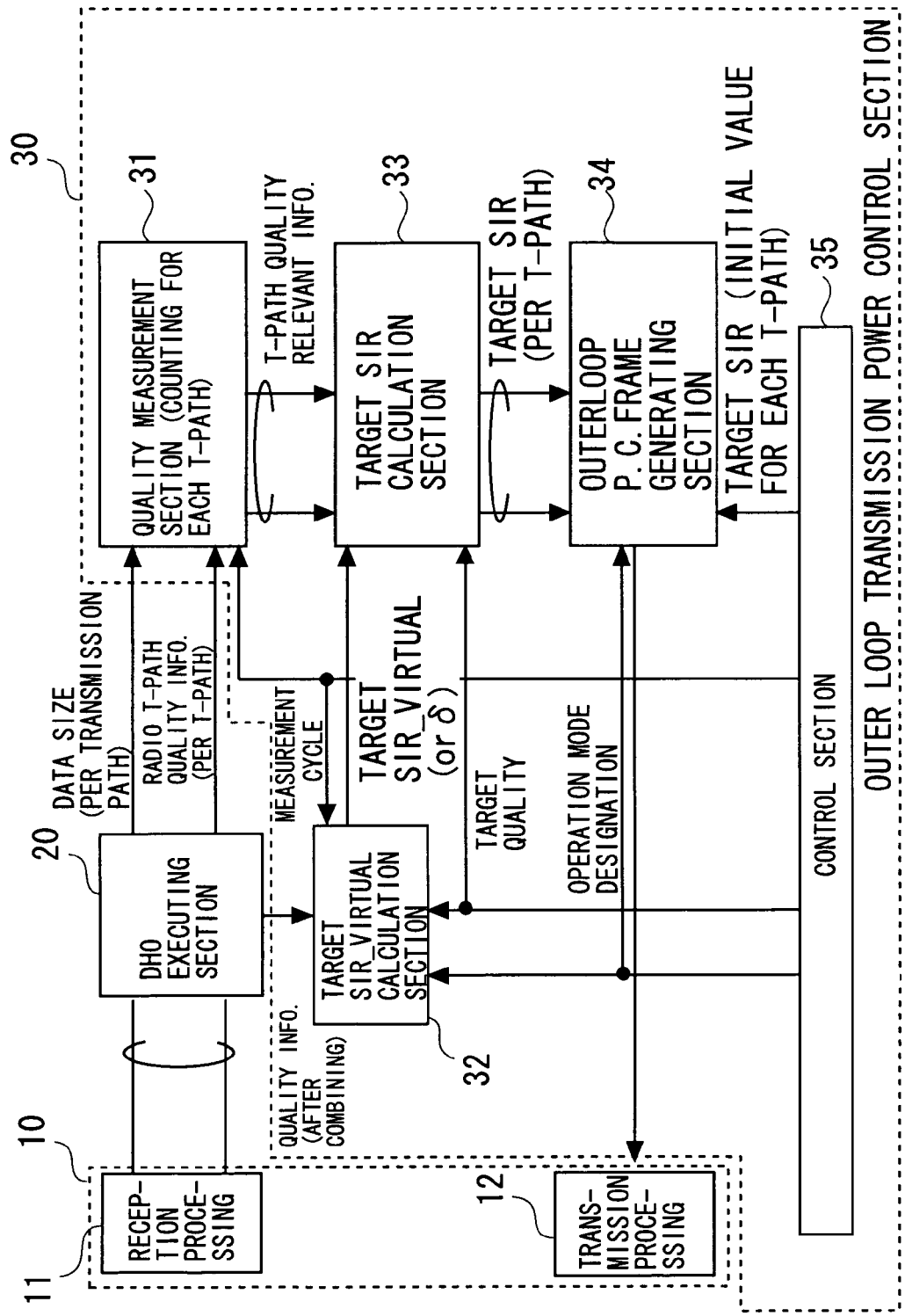
FIG. 10 is a diagram showing a configuration example of the DHO executing section and the outer loop executing section.

FIG. 10 is a diagram showing an example of a configuration of the DHO executing section and the outer loop executing section. FIG. 10 shows a transmission and reception processing section 10, a DHO executing section 20, and an outer loop transmission power control section (outer loop executing section: corresponding to a transmission power control target value calculating apparatus) 30.

A reception processing section 11 of the transmission and reception processing section 10 sends segments received through multiple radio transmission paths to the DHO executing section 20. The DHO executing section 20 has the configuration shown in FIG. 5, and performs assembling of the segments, de-interleaving, and error-correction decoding.

The DHO executing section 20 performs quality information detection processing for the radio transmission paths and combined data. Specifically, the DHO executing section 20 outputs quality information of resultant data obtained after diversity combining has been applied to received data (quality of the combined data). The DHO executing section 20 also outputs, as information on the data (segments) before combining is applied, a data size (data amount) of each of the segments and radio transmission path quality information (quality information of each radio transmission path).

As the quality information and the radio transmission path quality information, for example, an error check result (data amount, error data amount (error rate)), such as CRC check results (CRC calculation results) of each segment and the combined data, shown in FIG. 3, can be used.

Further, as the radio transmission path quality information, power control information (for example, TPC command) used for the inner loop transmission power control in the radio section can be used. For example, it is possible to collect TPC commands for each radio transmission path for a predetermined measurement period of time, and calculate the value indicating the quality of each radio transmission path from the number of power increase instructions and the number of power reduction instructions included in the collected TPC commands.

Further, when a multicarrier radio system such as an OFDM or OFCDM system is used as a radio system in the radio section, information of sub carriers (reception available sub carriers) to be used for data transmission and reception in each radio transmission path (or fading occurrence rates at multiple sub carriers) can be used as radio transmission path quality information. For example, a sub carrier use ratio of each radio transmission path (ratio of reception available sub carriers to the total sub carriers) can be used as the value indicating the quality of each radio transmission path.

Alternatively, it is also conceivable that quality information (bit error rate (BER)) of control data for processing target data (control data attached to data), sent in the radio section, is used as radio transmission path quality information. In the basic configuration shown in FIG. 3, even when an error occurred in a certain radio transmission path cannot be corrected, it is sufficient that the error is removed by error-correction decoding applied to combined data, which is obtained by combining pieces of data sent from all radio transmission paths. Therefore, it is preferred that, instead of quality information (transport channel BER (TrCH BER) measurement value) of target data, quality information (physical channel BER (PhyCH BER) measurement value) of control data used for transmission and reception of the target data be used as radio transmission path quality information. For example, an error rate of the control data can be used as radio transmission path quality information.

Note that a TrCH BER measurement value is the average value of BERs for a measurement period (TTI cycle of TrCH). A measurement target of TrCH BER is DPDCH. Further, a PhyCH BER measurement value is the average of BERs for a measurement period (TTI cycle of TrCH: when made effective through IE "QE-Selector" in C-Plane, indicated in TS25.433). A measurement target of PhyCH BER is DPCCH.

The DHO executing section 20 obtains the above-described quality information and radio transmission path quality information. The radio transmission path quality information is configured by one of or any combination of the above-mentioned CRC calculation result, power control information, available sub carrier information, and control data quality information.

The outer loop executing section 30 includes a quality measuring section 31, a target SIR_virtual calculating section 32 serving as a first target value calculating section, a target SIR calculating section 33 serving as a second target value calculating section, an outer loop P.C. frame generating section (frame generating section) 34, and a control section 35.

The quality measuring section 31 receives the data size and the radio transmission path quality information of each radio transmission path, which are outputted from the DHO executing section 20. The quality measuring section 31 accumulates the data size and the radio transmission path quality information for a predetermined measurement period of time specified by the control section 35, and outputs, as transmission path quality relevant information, predetermined parameters (data ratio and error rate) obtained from the accumulated data size and radio transmission path quality information of each radio transmission path.

The target SIR_virtual calculating section 32 calculates a target SIR_virtual (first transmission power control target value) based on the quality information on the combined data, which is outputted from the DHO executing section 20. The target SIR calculated by the target SIR_virtual calculating section 32 is not used for an actual radio transmission path but is used for resultant data obtained by combining pieces of data sent from multiple radio transmission paths, so it is called "target SIR_virtual". The target SIR_virtual is a power control target value in the radio section.

The target SIR_virtual calculating section 32 calculates a target SIR_virtual and outputs the value indicating a target SIR_virtual, according to the operation mode and the target quality specified by the control section 35. The target SIR_virtual calculating section 32 sends the value indicating the calculated target SIR_virtual to the target SIR calculating section 33.

The target SIR calculating section 33 calculates a target SIR (second transmission power control target value) to be used for each radio transmission path based on the value indicating the target SIR_virtual sent from the target SIR_virtual calculating section 32 and the transmission path quality relevant information of each radio transmission path sent from the quality measuring section 31. The target SIR calculating section 33 calculates the target SIR according to the target quality notified by the control section 35. The target SIR calculating section 33 sends the target SIR calculated for each radio transmission path to the frame generating section 34.

The frame generating section 34 generates outer loop P.C. frames that include the target SIRs corresponding to the radio transmission paths (frames corresponding to the radio transmission paths), and sends the frames to a transmission processing section 12 of the transmission and reception processing section 10. The frame generating section 34 operates according to an operation mode specified by the control section 35.

The transmission processing section 12 sends the frames that include the target SIRs to an execution section (for example, the base stations and the mobile terminal) that executes the inner loop transmission control based on the target SIRs.

The control section 35 mainly performs the following operation to control an operation of the outer loop transmission power control section 30. Specifically, the control section 35 gives timing information on a predetermined measurement cycle to the quality measuring section 31 and the target SIR_virtual calculating section 32. According to this information, the quality measuring section 31 and the target SIR_virtual calculating section 32 synchronously perform measurement processing at intervals of the measurement cycle.

Further, the control section 35 sends the same target quality (quality target value) to the target SIR_virtual calculating section 32 and the target SIR calculating section 33. According to the same target quality (for example, error rate), the target SIR_virtual calculating section 32 and the target SIR calculating section 33 calculate the target SIR_virtual and the target SIR for each radio transmission path, respectively.

Further, the control section 35 notifies designation of the same operation mode to the target SIR_virtual calculating section 32 and the frame generating section 34. The types of operation modes include a mode (referred to as operation mode 1) in which the target SIR_virtual calculating section 32 outputs the difference value between the last target SIR_virtual and the current target SIR_virtual and a mode (referred to as operation mode 2) in which the target SIR_virtual calculating section 32 outputs the target SIR_virtual itself.

The above-described outer loop transmission power control section 30 is realized when, in an information processing apparatus that includes a processor (for example, CPU), a storage device (memory) which has stored a program and data, and an input and output interface, the processor executes the program stored in the storage device. Hereinafter, individual components of the outer loop transmission power control section 30 will be described in detail.

[Quality Measuring Section]

Figure 11:
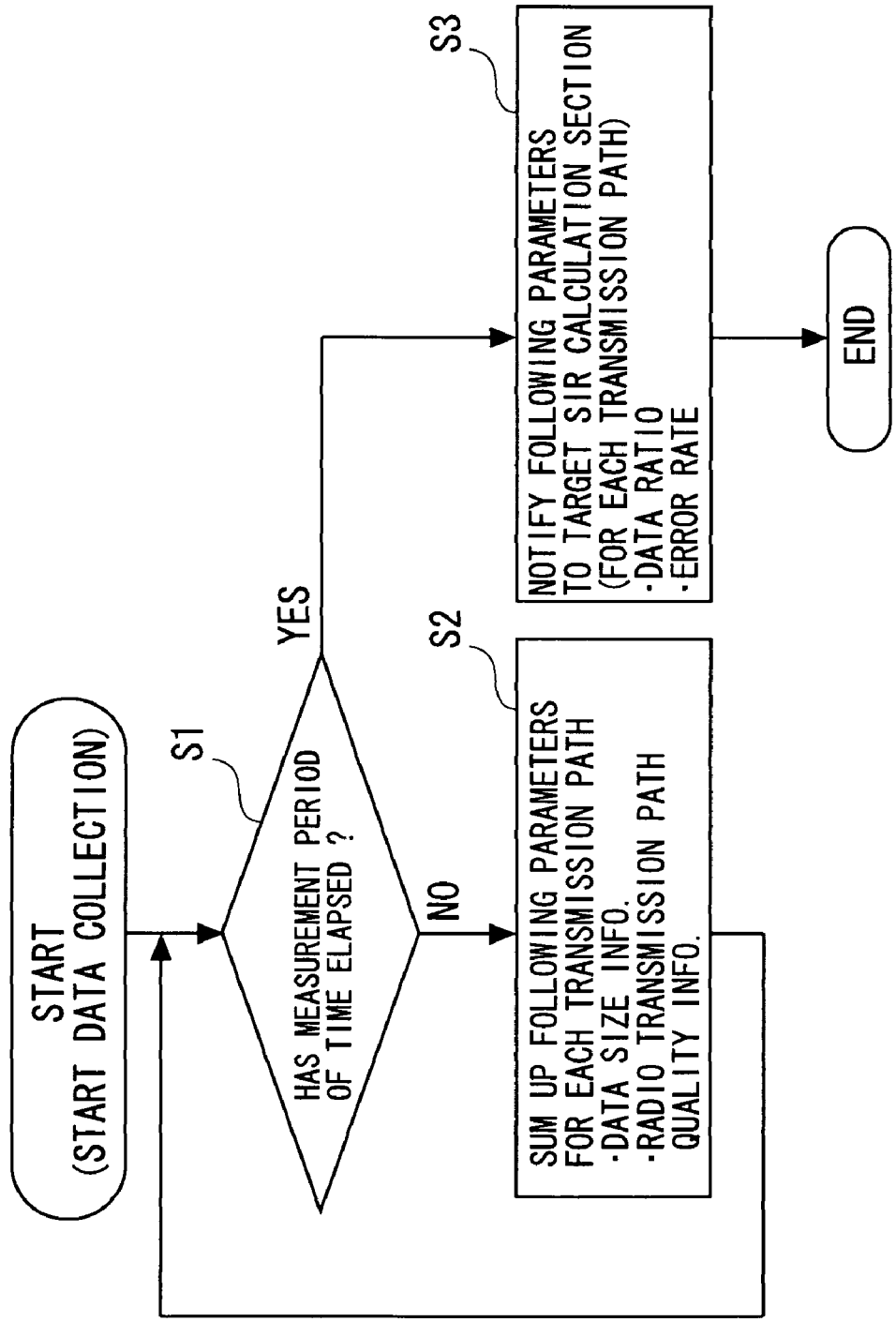
FIG. 11 is an explanatory diagram of processing performed by a quality measuring section shown in FIG. 10.

The quality measuring section 31 collects the data size and the radio transmission path quality information for each radio transmission path for a given measurement period of time, at intervals of the predetermined measurement cycle. FIG. 11 is an explanatory diagram of processing performed by the quality measuring section 31.

The quality measuring section 31 starts the processing shown in FIG. 11 at data collection start timing occurring at intervals of the measurement cycle. The quality measuring section 31 determines whether the measurement period of time has elapsed (S1).

When the measurement period of time has not elapsed (NO in S1), the quality measuring section 31 accumulates, for each radio transmission path, (1) data size information and (2) radio transmission path quality information, until the measurement period of time has elapsed (S2).

When the measurement period of time has elapsed (YES in S1), the quality measuring section 31 calculates <1> a data ratio (the ratio of data which has been distributed to each radio transmission path) and <2> a data error rate, based on the accumulated data, and notifies the calculation results to the radio transmission path target SIR calculating section 33 (S3).

In the above-described processing, the data ratio is calculated as follows, for example. Specifically, when the measurement period of time has elapsed, the quality measuring section 31 calculates the total value of the data size of each radio transmission path, which are obtained during the measurement period of time. The quality measuring section 31 can obtain the data ratio (data distribution ratio) for each of the radio transmission paths by obtaining the ratio of the total values between the radio transmission paths.

Further, the error rate can be obtained as follows. For example, when the CRC calculation result of each segment is used as the radio transmission path quality information, a received data (segment) amount (bit) and an error amount (bit) in the received data, which are obtained through the CRC calculation applied to the segment, are accumulated for each radio transmission path during the measurement period of time. When the measurement period of time has elapsed, the error rate of each radio transmission path is calculated from the total value (cumulative total value) of the received data amounts and that of the error amounts of each radio transmission path.

FIG. 12 is a diagram showing an example of collected transmission path quality relevant information. FIG. 12 shows a case where, for data sent through the radio transmission paths #0 and #1, the data ratios of the radio transmission paths #0 and #1 are ½ (0.5), the error rate of the radio transmission path #0 is 0.1, and the error rate of the radio transmission path #1 is 0.05.

[Target SIR_Virtual Calculating Section]

The target SIR_virtual calculating section 32 determines whether received data has desired quality, from quality information (error rate) calculated based on a data decoding result (combined data) after DHO processing is performed, and calculates a target SIR_virtual based on this determination result.

For example, the target SIR_virtual calculating section 32 receives, as quality information, CRC calculation results (received data amount (bit) and error amount (bit)) of multiple pieces of combined data from the DHO executing section 20 during the predetermined measurement period of time. When the measurement period of time has elapsed, the target SIR_virtual calculating section 32 obtains an actual measurement value of the error rate to the combined data, from the cumulative values of the CRC calculation results (total value of the received data amounts and that of the error amounts).

On the other hand, the target SIR_virtual calculating section 32 receives a target value for the error rate as target quality from the control section 35. The target SIR_virtual calculating section 32 compares an actual measurement value of the error rate with the target value, and calculates the target SIR based on the result.

FIG. 13 is a diagram showing an example of processing performed by the target SIR_virtual calculating section 32. In FIG. 13, three patterns obtained through the processing performed by the target SIR_virtual calculating section 32 are shown in a table. The three patterns are, based on the received data amount and the error amount: a case where an error rate higher than the target value (for example, 0.01) for the error rate is obtained (first pattern); a case where an error rate equal to the target value is obtained (second pattern); and a case where an error rate lower than the target value is obtained (third pattern).

The target SIR_virtual calculating section 32 calculates a target SIR_virtual such that an actual measurement value of the error rate equals the target value. When an actual measurement value of the error rate is higher than the target value, the target SIR_virtual calculating section 32 calculates a target SIR_virtual to reduce the error rate (increase the target SIR (transmission power)) (increase processing). When an error rate is equal to the target value, the target SIR_virtual calculating section 32 does not increase or reduce the target SIR. When an error rate is lower than the target value, the target SIR_virtual calculating section 32 calculates a target SIR_virtual to reduce the target SIR (transmission power) (reduction processing).

The target SIR_virtual calculating section 32 can, for example, output a target SIR_virtual (notify the target SIR_virtual to the target SIR calculating section 33) only when a difference value d in target SIR_virtual occurs. In this case, the target SIR_virtual calculating section 32 stores the target SIR_virtual calculated last time, and when a new target SIR_virtual is calculated, calculates the difference value d between the last target SIR_virtual and the current target SIR_virtual (d=target SIR_virtual (last time)-target SIR_virtual (this time)). When the difference does not occur (that is, d is 0), the target SIR_virtual is not notified, whereas when the difference occurs (that is, d is not 0), the target SIR_virtual is notified.

As a value to be notified (value indicating a target SIR_virtual), either the target SIR_virtual itself or the difference value d can be selected. The target SIR_virtual calculating section 32 changes the value to be notified, corresponding to an operation mode specified by the control section 35. Specifically, the target SIR_virtual calculating section 32 calculates and outputs the difference value d in the operation mode 1, and outputs the target SIR_virtual itself in the operation mode 2.

In the operation mode (operation mode 2) in which the difference value d is not calculated, the target SIR_virtual calculating section 32 does not need to hold the last target SIR_virtual. In this case, the storage area is efficiently used and the processing is simplified.

Note that, in this example, the difference value d has a negative value in a case of the increase processing (last target SIR_virtual is smaller than the current target SIR_virtual) and has a positive value in a case of the reduction processing (last target SIR_virtual is larger than the current target SIR_virtual). Accordingly, in the operation mode 1, an increase or reduction in the target SIR can be understood from the difference value d. In contrast to this, in the operation mode 2, for example, information indicating an increase or reduction in the target SIR is notified together with the target SIR_virtual. However, the target SIR calculating section 33 may be configured to hold the last target SIR_virtual, calculate the difference, and determine whether the current target SIR_virtual indicates an increase or reduction in the target SIR. In this case, it is not necessary to notify the information indicating an increase or reduction in the target SIR.

[Target SIR Calculating Section]

The target SIR calculating section 33 collects the value indicating a target SIR_virtual (target SIR_virtual or difference value d) notified by the target SIR_virtual calculating section 32, and the transmission path quality relevant information (data ratio and error rate of each radio transmission path) notified by the quality measuring section 31. The target SIR calculating section 33 uses the collected target SIR_virtual and the transmission path quality relevant information to calculate a target SIR to be actually required of each radio transmission path.

The target SIR calculating section 33 performs the processing, for example, when the target SIR_virtual or the difference value d is notified by the target SIR_virtual calculating section 32.

Figure 14:
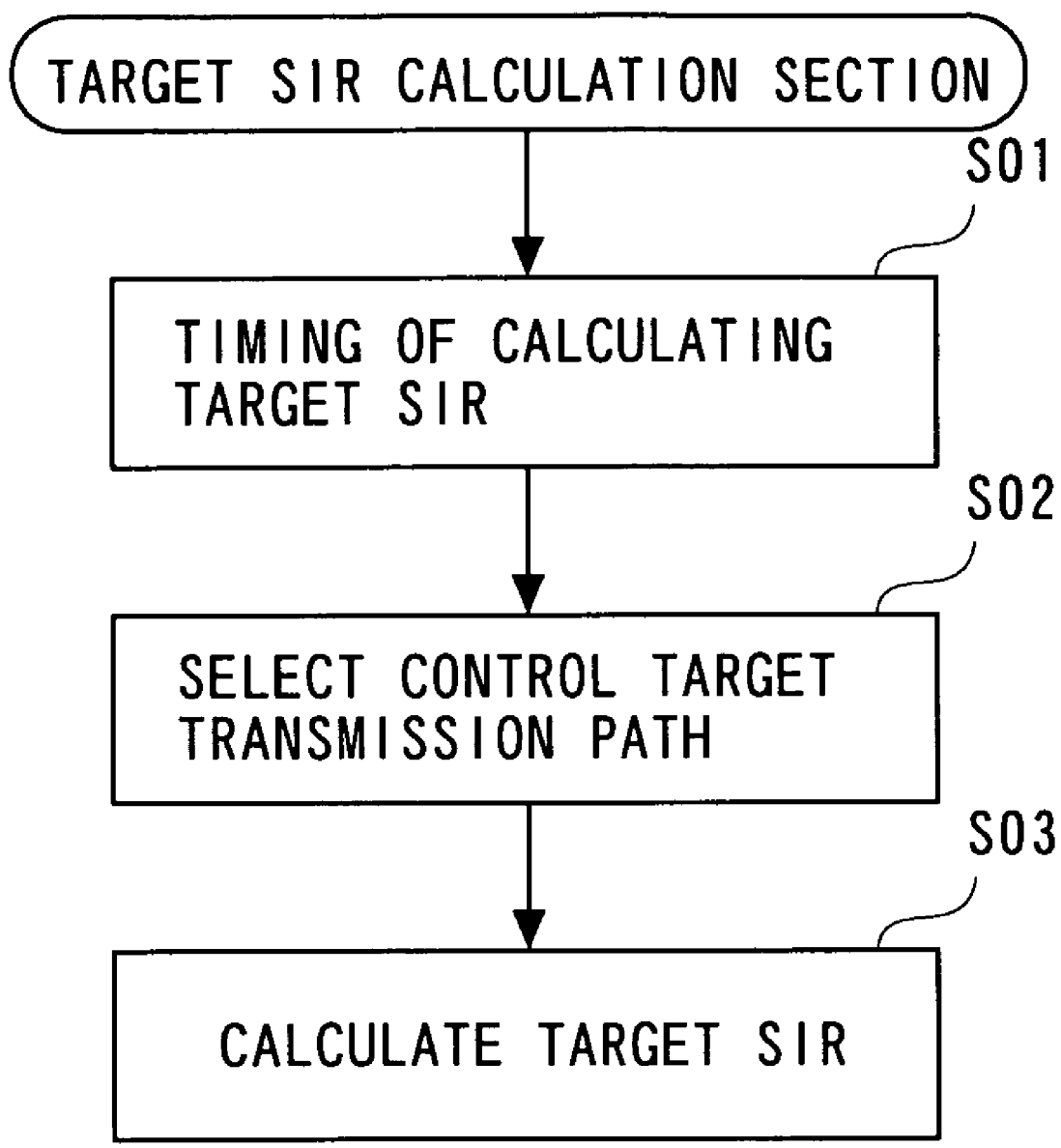
FIG. 14 is a diagram showing an outline of processing performed by a target SIR calculating section shown in FIG. 10.

FIG. 14 is a diagram showing an outline of the processing performed by the target SIR calculating section. When timing of calculating a target SIR comes (S01), the target SIR calculating section 33 selects a control target transmission path among multiple radio transmission paths (S02) and calculates the target SIR for the selected control target transmission path (S03).

[[Timing of Calculating Target SIR]]

The following two cases can be regarded as the timing of calculating (timing of updating) the target SIR, to be detected (S01) by the target SIR calculating section 33.

1) When the value indicating a target SIR_virtual is received from the target SIR_virtual calculating section 32.

(2) When the data ratio for each radio transmission path is changed.

The target SIR calculating section 33 can detect that the data ratio for each radio transmission path has been changed, based on the data ratio notified by the quality measuring section 31. Calculation of a target SIR corresponding to the changed data ratio will be described later.

[[Selection of a Control Target Transmission Path]]

The following two systems can be used when the target SIR calculating section 33 performs the selection processing (S02) of a control target transmission path.

(System A) All radio transmission paths are selected as control target transmission paths.

(System B) A control target transmission path is determined based on a result of comparison between the final target quality and the quality of each radio transmission path.

When System B is used, the target SIR calculating section 33 compares the error rate of received data (segment) sent through each radio transmission path with the target quality for (error rate of) combined data obtained after diversity combining, and determines whether the corresponding radio transmission path is set to a control target, based on the comparison result.

FIG. 15 shows example error rates to be compared in System B. FIG. 15 shows actual measurement values (0.1 and 0.05) of the error rates of the radio transmission paths #0 and #1, an actual measurement value (0.02) of the error rate of received data (combined data) obtained after DHO (diversity combining), and a target value (0.01) for the error rate. The target value for the error rate is notified from the control section 35 to the target SIR calculating section 33 (FIG. 10).

The target SIR calculating section 33 compares the error rate of each of the radio transmission paths with the target value. At this time, when there is a radio transmission path whose error rate is equal to the target value, the radio transmission path is not set to a control target. When the error rate of a radio transmission path is different from the target value, the radio transmission path is set to a control target candidate. In an example shown in FIG. 15, the radio transmission paths #0 and #1 are set to control target candidates.

Next, the target SIR calculating section 33 determines whether the error rate of each of the radio transmission paths that are the control target candidates is higher or lower than the target value (target quality). Further, the target SIR calculating section 33 determines, for each of the radio transmission paths that are the control target candidates, whether the value indicating a target SIR_virtual notified by the target SIR_virtual calculating section 32 indicates an increase or reduction in the target SIR.

When an increase in the target SIR is indicated and the error rate is higher than the target quality, the corresponding radio transmission path is not set to a control target. Accordingly, an unnecessary increase in the power of this radio transmission path is avoided, and power consumption can be suppressed.

When a reduction in the target SIR is indicated and the error rate is lower than the target quality, the corresponding radio transmission path is not set to a control target. Accordingly, further deterioration in quality caused by a reduction in the power of this radio transmission path is avoided.

Instead of the above-described method (referred to as "method 1"), a method (method 2) in which the upper and lower limit values are prepared for the quality of radio transmission paths as determination parameters different from the target value, so as to determine whether each radio transmission path is set to a control target can be used.

Figure 17:
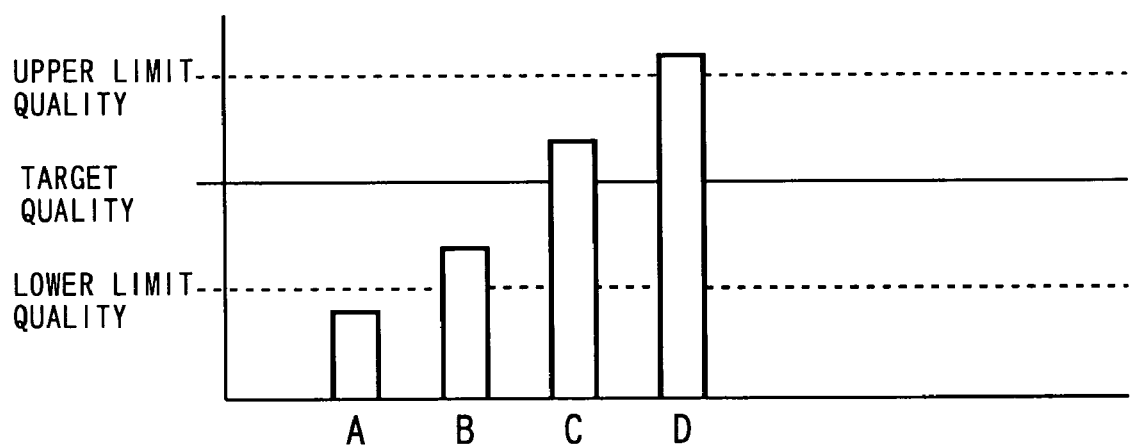
FIG. 17 is a diagram showing relationships among the target quality, the upper and lower limit values of the quality, and the radio transmission paths shown in FIG. 16.

FIG. 16 is a diagram for explaining a control target transmission path determination method according to the method 2. FIG. 16 shows an example of determination as to whether radio transmission paths A to D are set to control targets, based on the target quality, the upper and lower limit quality values, and the value indicating a target SIR_virtual (an increase or reduction in the target SIR). FIG. 17 is a diagram showing relationships among the target quality, the upper and lower limit quality values, and the radio transmission paths A to D shown in FIG. 16.

FIG. 16 shows a table that includes, for each of the radio transmission paths A to D, the state of the error rate of the radio transmission path with respect to the target quality, an increase or reduction in the target SIR, indicated by the value indicating a target SIR_virtual, and a result of determination as to whether the radio transmission path is set to a control target.

In FIG. 16, an increase in the target SIR is expressed by "+" and a reduction in the target SIR is expressed by "−". Radio transmission paths determined to be control targets are expressed by "o" and radio transmission paths determined not to be control targets are expressed by "x".

FIG. 17 shows a bar chart showing the quality of the radio transmission paths A to D based on their error rates. The bar chart shows how small the error rate of each of the radio transmission paths is, and a radio transmission path having a smaller error rate is expressed with a taller bar. A value indicating the level of quality based on an error rate, shown in this bar chart, is called "a quality value".

As shown in FIGS. 16 and 17, the quality value of the radio transmission path A is lower than the target quality value. In this case, when an increase in the target SIR is indicated, the radio transmission path A is determined to be a control target (in FIG. 16, expressed by o). In contrast to this, when a reduction in the target SIR is indicated, the radio transmission path A is determined not to be a control target. This is to prevent a reduction in quality to be caused by a further reduction in power.

Further, the quality value of the radio transmission path B is higher than the lower limit quality value but is lower than the target quality value. In this case, the radio transmission path B is determined to be a control target whichever is indicated in the target SIR, an increase or reduction.

Further, the quality value of the radio transmission path C is higher than the target quality value but is lower than the upper limit quality value. In this case, the radio transmission path C is determined to be a control target whichever is indicated in the target SIR, an increase or reduction.

Further, the error rate of the radio transmission path D is higher than the upper limit quality value. In this case, when an increase in the target SIR is indicated, the radio transmission path D is determined not to be a control target. This is to avoid wasting power by suppressing an unnecessary increase in the power. In contrast to this, when a reduction in the target SIR is indicated, the radio transmission path D is determined to be a control target.

As described above, control target transmission paths are determined among multiple radio transmission paths.

[[Calculation of a Target SIR for Each Radio Transmission Path]]

The following two systems can be used as an SIR changing method which can be used for the processing of calculating a target SIR for a control target transmission path (S03), performed by the target SIR calculating section 33.
(System 1) The SIR is changed by a given value.
(System 2) The SIR is changed by an amount determined based on the ratio of the error rates of radio transmission paths.

When System 1 is used, the target SIR calculating section 33 compares the error rate (error rate of FIG. 12) of received data (segment) sent through each of the radio transmission paths that are control targets, with the target value for the error rate (error rate (target) of FIG. 13).

When the error rate is equal to the target value, the target SIR calculating section 33 does not change the target SIR (does not calculate a new target SIR). In contrast to this, when the error rate is different from the target value, the target SIR calculating section 33 increases or reduces the current target SIR by a given amount or at a given percentage determined in advance, according to an instruction to increase or reduce the SIR, indicated by the value indicating a target SIR_virtual. The value thus obtained is the changed target SIR.

When System 2 is used, the target SIR calculating section 33 calculates an allocation value (weight) R used to determine the target SIR, from the transmission path quality relevant information (the data ratio and the error rate) of a control target transmission path. Weights R are used to determine how the target SIR_virtual is allocated among the radio transmission paths, and are determined based on the ratio of the error amounts of the radio transmission paths. Therefore, each of the weights R indicates a weight in error occurrence in each of the radio transmission paths.

For example, when there are two radio transmission paths #0 and #1, the weight (error ratio) R can be defined by Expression 1.

$$R = A\alpha(\text{or}(B\beta))/A\alpha + B\beta (0 \leq R \leq 1) \quad \text{(Expression 1)}$$

Note that, "A" is the data ratio of the radio transmission path #0, and "α" is the error rate of the radio transmission path #0. Further, "B" is the data ratio of the radio transmission path #1, and "β" is the error rate of the radio transmission path #1.

The value obtained by multiplying the value calculated by Expression 1 by the target SIR_virtual (in the case of the operation mode 2) is specified as a target SIR to be specified for each radio transmission path. Further, a certain amount of a positive margin (Δ) can be set for the calculated value (SIR update amount). However, setting the margin is an option.

A generalized expression of Expression 1 is as follows.
[Mathematical Expression 1]

$$Rc = \alpha c A c \Big/ \sum_{x=1}^{n} \alpha x A x$$

In this generalized expression, "A" indicates the data ratio of each radio transmission path, "α" indicates the error rate of each radio transmission path, "x" indicates the number of all control target transmission paths (x=1, 2, . . . n−1, n: where n is a natural number), and "c" indicates any of the control target transmission paths (c=1, 2, . . . c−1, c: where c is a natural number).

Figure 18:
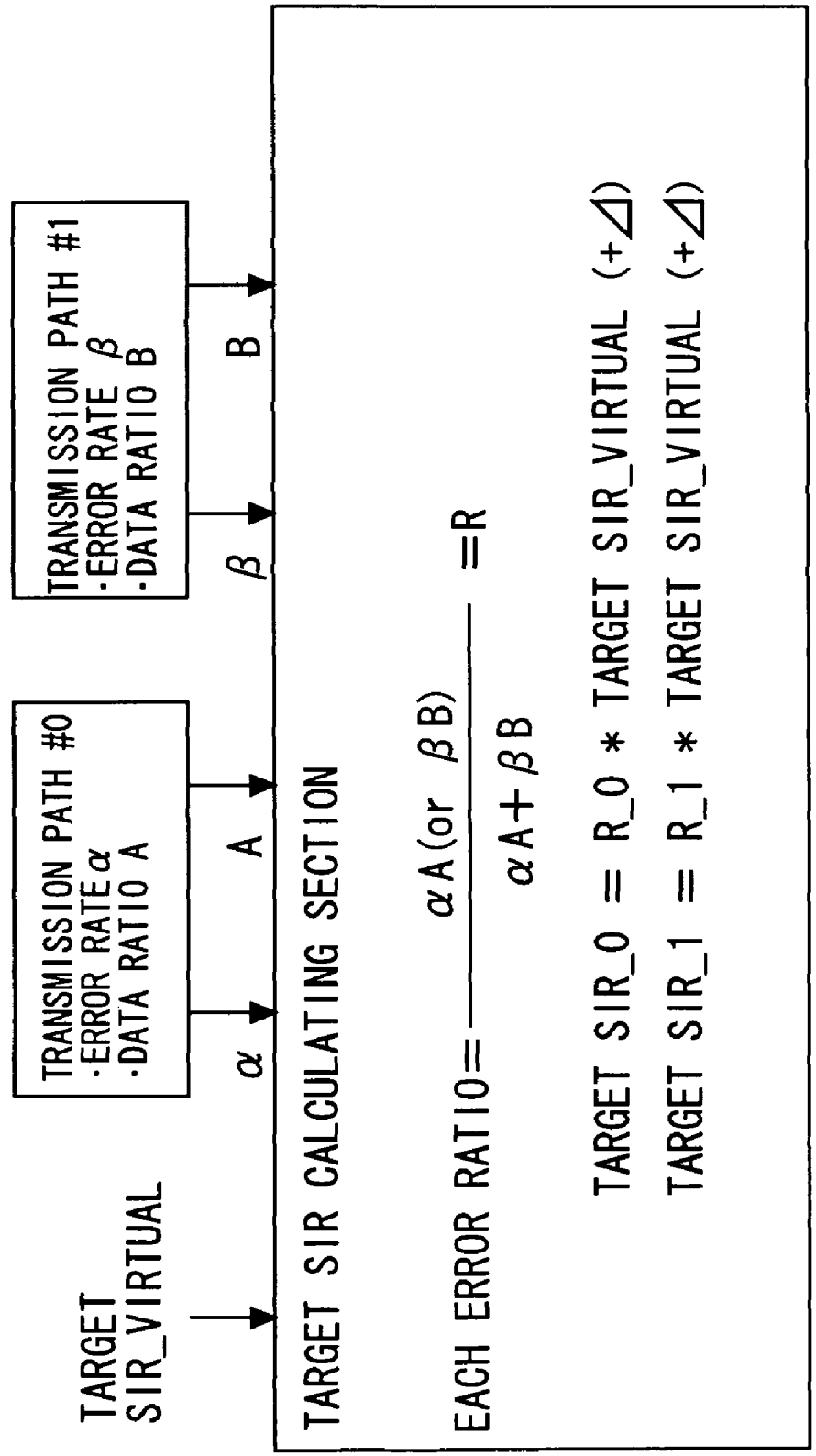
FIG. 18 is an explanatory diagram of calculation processing of a target SIR (in a case of an operation mode 2), performed by the target SIR calculating section.

FIG. 18 is an explanatory diagram of calculation processing of a target SIR (in the case of the operation mode 2), performed by the target SIR calculating section 33. As shown in FIG. 18, a target SIR_virtual is inputted from the target SIR_virtual calculating section 32 to the target SIR calculating section 33. Further, the transmission path quality relevant information of each radio transmission path is inputted to the target SIR calculating section 33. In an example shown in FIG. 18, as the transmission path quality relevant information of the radio transmission paths #0 and #1, an error rate α and a data ratio A of the radio transmission path #0 and an error rate β and a data ratio B of the radio transmission path #1 are inputted.

The target SIR calculating section 33 uses α, A, β, and B to calculate weights R (R_0 and R_1) for the radio transmission paths #0 and #1 by Expression 1. Then, the target SIR calculating section 33 obtains target SIRs (target SIR_0 and target SIR_1) for the radio transmission paths #0 and #1 by Expression 2 and Expression 3, respectively.

$$\text{Target SIR\_0} = R\_0 * \text{Target SIR\_virtual} (+\Delta) \quad \text{(Expression 2)}$$

$$\text{Target SIR\_1} = R\_1 * \text{Target SIR\_virtual} (+\Delta) \quad \text{(Expression 3)}$$

In the processing performed by the target SIR calculating section 33, shown in FIG. 18, when the value indicating a target SIR_virtual indicates the target SIR_virtual (operation mode 2), the allocation amounts of the target SIR_virtual to the radio transmission paths are determined by Expression 2 and Expression 3.

FIG. 19 is a diagram showing an example in which the target SIR for each radio transmission path is calculated from the target SIR_virtual. In FIG. 19, as the value indicating a target SIR_virtual, the target SIR_virtual (target SIR_virtual=10 (dB)) is given. Further, as R (R_0 and R_1) for the radio transmission paths #0 and #1, R_0=3 and R_1=2 are obtained, respectively, through calculation according to Expression 1. Therefore, as the target SIRs for the radio transmission paths #0 and #1, 6 (dB) and 4 (dB) are obtained, respectively, through calculation. However, a margin is not considered in FIG. 19.

Alternatively, in the processing performed by the target SIR calculating section 33, described with reference to FIG. 18, when the value indicating a target SIR_virtual indicates the difference value d in target SIR_virtual (operation mode 1), the allocation amounts of the difference value d to the radio transmission paths are determined by Expression 2 and Expression 3.

FIG. 20 is a diagram showing an example (operation mode 1) in which the target SIR for each radio transmission path is calculated from the difference value d in target SIR_virtual. In FIG. 20, as the value indicating a target SIR_virtual, the difference value d in target SIR_virtual (target SIR_virtual (d)=5 (dB)) is given. The current target SIRs for the radio transmission paths #0 and #1 are 8 (dB) and 6 (dB), respectively. Further, as the weights R (R_0 and R_1) for the radio transmission paths #0 and #1, R_0=3 and R_1=2 are obtained, respectively, through calculation according to Expression 1. Therefore, as the target SIRs for the radio transmission paths #0 and #1, 11 (dB) and 8 (dB) are obtained, respectively, through calculation. However, a margin is not considered in FIG. 20.

Note that an example shown in FIG. 20 is a case where the target SIRs are increased. To reduce the target SIRs, a calculated weight for each of the radio transmission paths is subtracted from the current target SIR.

Figure 21A:
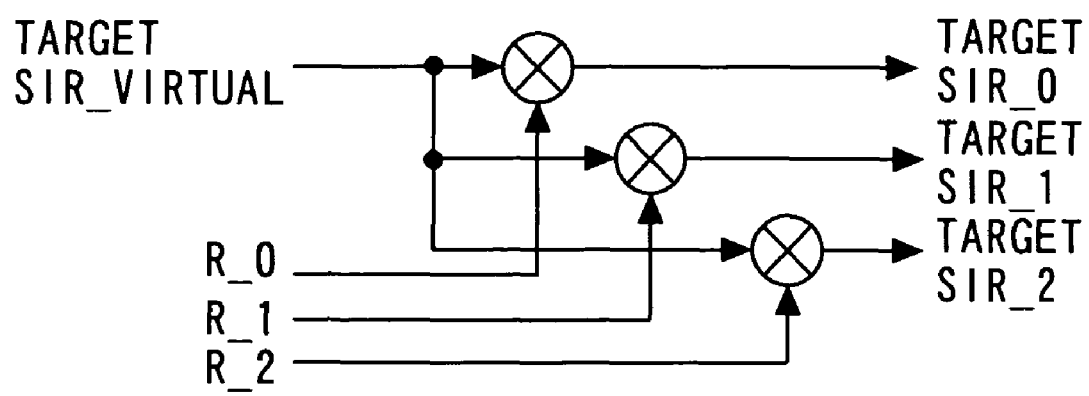
FIG. 21A is a diagram showing an example of an algorithm of target SIR calculation performed by the target SIR calculating section when a target SIR_virtual is inputted (operation mode 2).
Figure 21B:
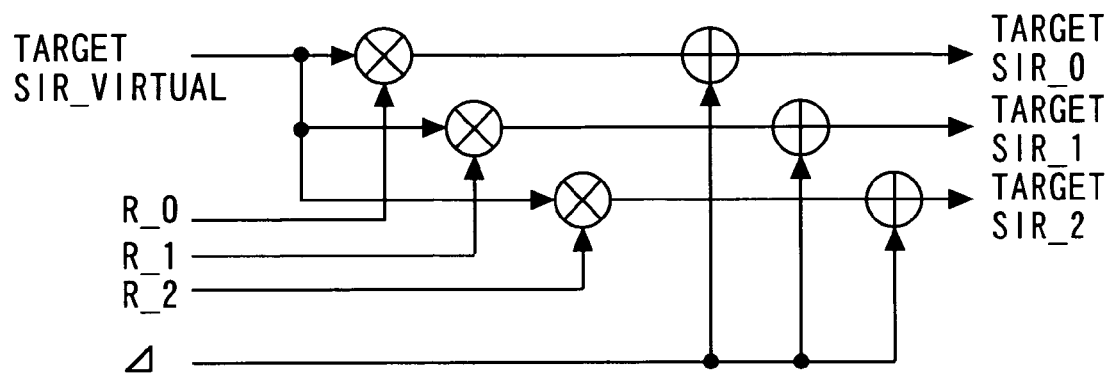
FIG. 21B is a diagram showing an example of an algorithm of target SIR calculation performed by the target SIR calculating section when a target SIR_virtual is inputted (operation mode 2).

FIGS. 21A and 21B show examples of algorithm of target SIR calculation performed by the target SIR calculating section 33 when a target SIR_virtual is inputted (operation mode 2). FIGS. 21A and 21B show example of cases where target SIRs for three radio transmission paths #0, #1, and #2 are calculated. FIG. 21A shows a configuration in which a margin is not added. FIG. 21B shows a configuration in which a margin is added.

In FIG. 21A, a target SIR_virtual and weights R (R_0, R_1, and R_3) for the radio transmission paths #0, #1, and #2 are inputted. Then, multipliers prepared for the respective radio transmission paths multiply the target SIR_virtual by the corresponding weights R. As a result, the target SIRs (target SIR_0, target SIR_1, and target SIR_2) for the radio transmission paths #0, #1, and #2 are outputted.

In FIG. 21B, adders corresponding to the radio transmission paths #0, #1, and #2 are provided at a subsequent stage of the respective multipliers shown in FIG. 21A, and a margin Δ is inputted to the adders. Therefore, the value obtained by adding the margin Δ to the result obtained by multiplying the target SIR_virtual by the corresponding weight R is outputted as a target SIR for the corresponding radio transmission path.

Figure 22:
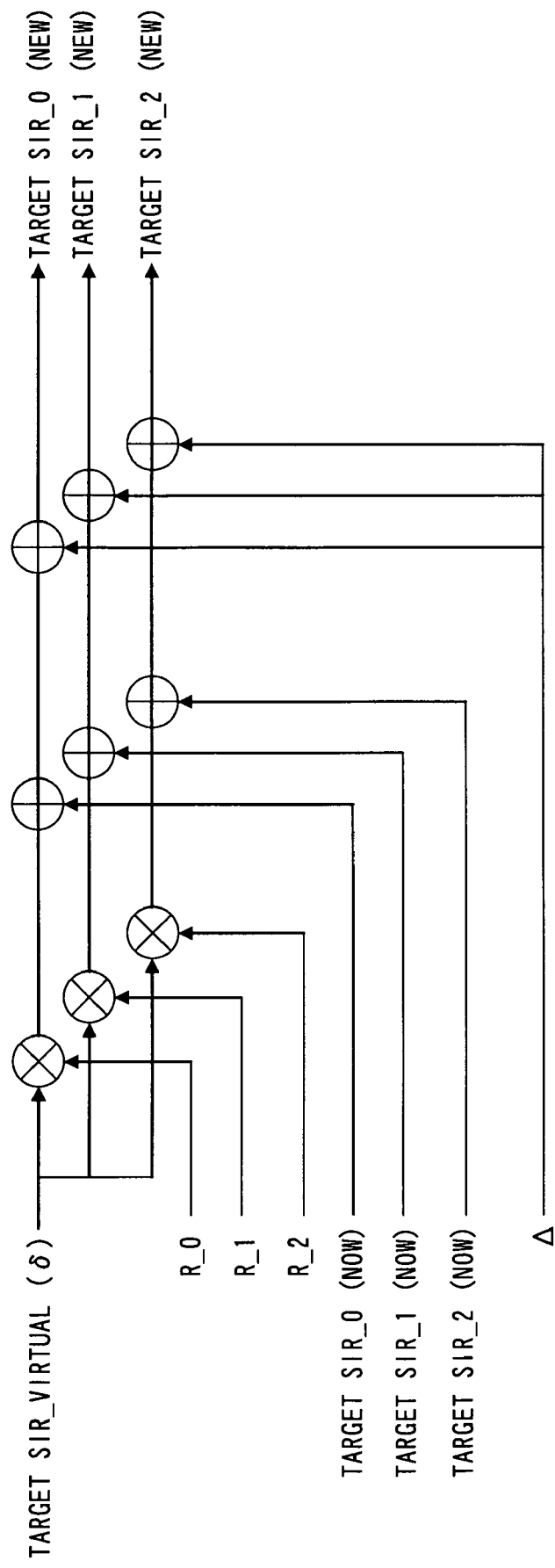
FIG. 22 is a diagram showing an example of an algorithm of target SIR calculation performed by the target SIR calculating section when a difference in target SIR_virtual is inputted (operation mode 1).

FIG. 22 shows an example of an algorithm of target SIR calculation performed by the target SIR calculating section 33 when the difference in target SIR_virtual is inputted (operation mode 1). FIG. 22 shows an example of case where target SIRs for the three radio transmission paths #0, #1, and #2 are calculated. FIG. 22 shows a configuration in which a margin Δ is added.

In FIG. 22, first, a multiplier prepared for each of the radio transmission paths multiplies the difference in target SIR_virtual (target SIR_virtual (d)) by the corresponding weight of the weights R (R_0, R_1, and R_3) for the radio transmission paths. Next, an adder corresponding to each of the radio transmission paths adds the corresponding SIR of the current target SIRs (target SIR_0 (NOW), target SIR_1 (NOW), and target SIR_2 (NOW)) for the radio transmission paths to the corresponding multiplication result. Then, an adder adds the margin Δ to each addition result. As a result, new target SIRs (target SIR_0 (NEW), target SIR_1 (NEW), and target SIR_2 (NEW)) for the radio transmission paths #0, #1, and #2 are outputted.

Note that, in the configuration of FIG. 22, to increase the target SIR, a difference value d (update amount) having a positive value is inputted. In contrast to this, to reduce the target SIR, a difference value d having a negative value is inputted. Further, when a margin is not added, the adders for the respective radio transmission paths, provided at the last stages are omitted from the configuration of FIG. 22. Further, the blocks each of which is configured by the multiplier and the adder(s) shown in FIGS. 21 and 22 are prepared corresponding to the number of radio transmission paths to be used, and only the number of the blocks corresponding to control target transmission paths are used.

As described above, the target SIR calculating section 33 calculates the target SIR for each radio transmission path that is a control target.

[Frame Generating Section]

When the target SIRs (or update amounts) for the respective radio transmission paths are notified by the target SIR calculating section 33, the outer loop P.C. frame generating section (frame generating section) 34 generates an outer loop P.C. frame which includes each of the target SIRs.

The frame generating section 34 performs processing according to an operation mode specified by the control section 35. Specifically, in the operation mode 1, in which the difference value (update amount) with respect to the value used for the last control is notified from the target SIR calculating section 33, the frame generating section 34 calculates the value by adding the notified difference value to the value used for the last control (the last target SIR) and generates a frame which includes the calculated value. In this case, the frame generating section 34 stores the value used for the last control.

In the operation mode 2, in which the current (new) target SIR is notified from the target SIR calculating section 33, the frame generating section 34 generates a frame which includes the notified target SIR.

Note that, in the operation mode 1, an initial value at the time of initial setting of each radio transmission path and an initial value at the time of additionally setting of a radio transmission path are separately notified. The notification of the initial value can be performed from the control section 35, for example (see FIG. 10).

The generated frame is sent from the transmission processing section 12 (FIG. 10) to the transmission destination of the frame. In the transmission destination, the target SIR or the difference value is extracted from the frame, and the target SIR currently used for the inner loop transmission power control is updated according to the extracted value.

As a result, when the target SIR is increased, the transmission power is increased and, therefore, the quality of the control target transmission path is improved. On the other hand, when the target SIR is reduced, the transmission power is reduced and, therefore, wasting power is suppressed in the control target transmission path.

<Updating the Target SIR when Data Ratio is Changed>

As described above, the target SIR can be updated when the target SIR calculating section 33 receives the value indicating a target SIR_virtual from the target SIR_virtual calculating section 32.

Further, the configuration can be made such that the target SIR is updated also when the target SIR calculating section 33 receives a notification of the occurrence of a change in the data ratio from the quality measuring section 31.

Figure 23:
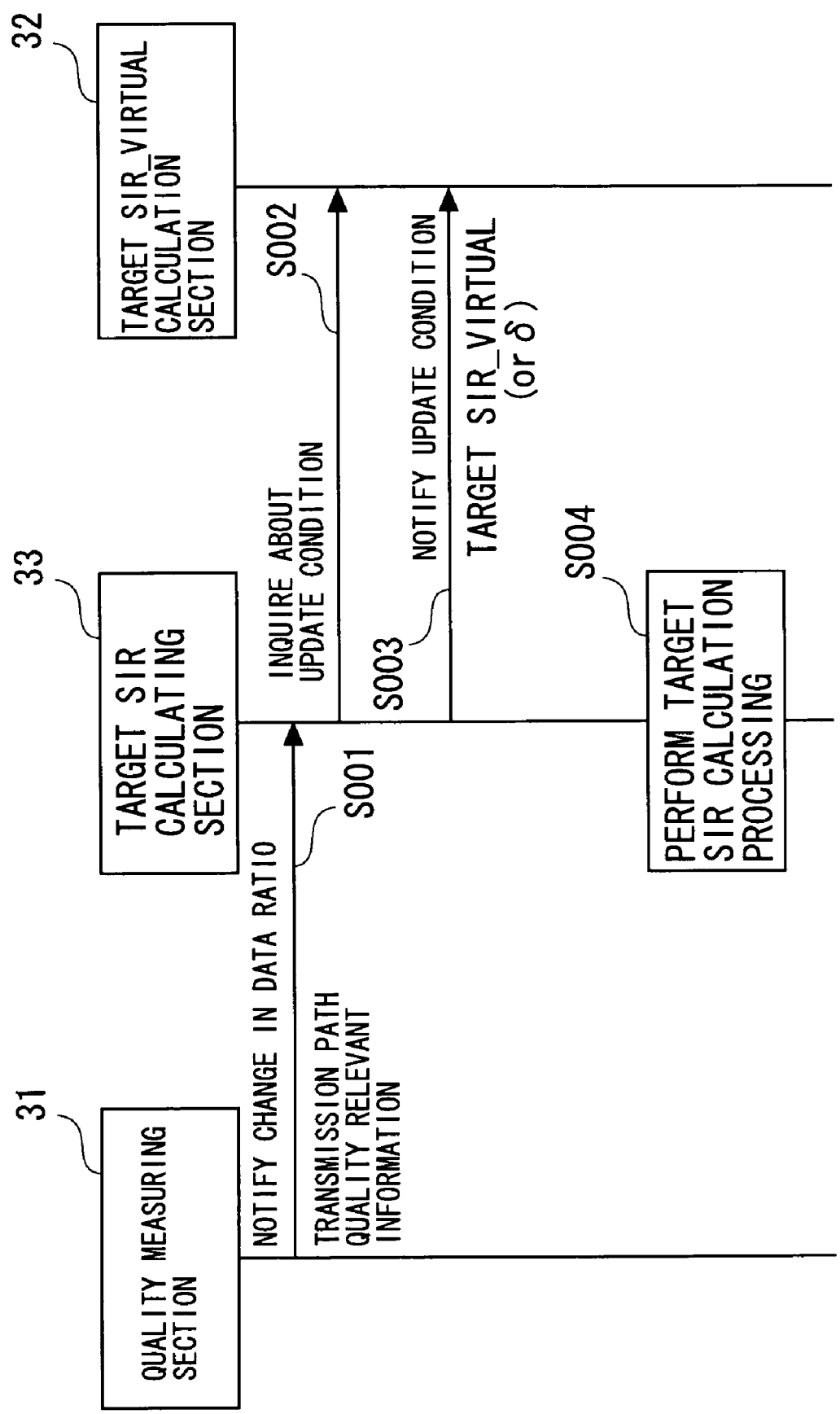
FIG. 23 is a diagram showing a processing sequence performed when a data ratio is changed.

FIG. 23 is a diagram showing a processing sequence performed when the data ratio is changed. As described with reference to FIGS. 6 and 7, in this embodiment, the division ratio of data distributed to the respective radio transmission paths (the data ratio for the radio transmission paths) can be determined according to the quality states of the radio transmission paths.

The data ratio for each of the radio transmission paths is measured by the quality measuring section 31. The quality measuring section 31 stores at least the data ratio calculated during the last measurement period. When it is determined that the current data ratio is different from the last data ratio (that the current data ratio exceeds an allowable range), the quality measuring section 31 gives a data ratio change notification to the target SIR calculating section 33 (S001).

Upon reception of the data ratio change notification, the target SIR calculating section 33 inquires of the target SIR_virtual calculating section 32 about an update condition (S002). At this time, the target SIR_virtual calculating section 32 determines whether the changed data ratio (data distribution ratio) satisfies a predetermined target-SIR_virtual update condition (which is held in the target SIR_virtual calculating section 32 in advance).

When the update condition is not satisfied, the target SIR_virtual calculating section 32 does not reply to the inquiry made by the target SIR calculating section 33 (continues the processing). On the other hand, when the update condition is satisfied, the target SIR_virtual calculating section 32 determines to reset the measurement processing performed for the target SIR_virtual calculation, calculates the value indicating a target SIR_virtual by using the measurement result currently obtained, and sends the value indicating a target SIR_virtual to the target SIR calculating section 33 as a reply to the inquiry (S003).

Since reception of the value indicating a target SIR_virtual is regarded as the timing of calculating a target SIR (as the update condition), the target SIR calculating section 33 calculates the target SIR for a control target transmission path by using the received value indicating a target SIR_virtual (S004).

Note that, when the target SIR_virtual calculating section 32 replies to the inquiry about the update condition, the measurement cycle for the target SIR_virtual calculation is cleared (reset) and measurement is restarted in a new measurement cycle.

Further, when the data ratio is changed, the target SIR calculating section 33 can also determine to calculate the target SIR (the target SIR_virtual or the allocation amount of the difference value δ) for a control target transmission path in consideration of the changed data ratio (data amount). Specifically, in the processing of Step S004, the target SIR calculating section 33 may use the data ratio before the change or use the data ratio after the change, for the target SIR calculation.

Instead of the above-described configuration, the configuration may be made such that, when the quality measuring section 31 detects a change in the data ratio, the measurement processings performed by the quality measuring section 31 and the target SIR_virtual calculating section 32 are reset (cleared) and the measurement processings are restarted in a new measurement cycle (measurement start timing).

Alternatively, the following configuration can be applied instead of the above-described configuration. Specifically, when the data ratio change notification is received, the target SIR calculating section 33 inquires of the target SIR_virtual calculating section 32 about the update condition (corresponding to S002). At this time, the target SIR_virtual calculating section 32 performs the following operation, for example.

When the data ratio is changed, the changed data ratio (data distribution ratio) is notified to the control section 35. The control section 35 recalculates the target quality (for example, error rate) corresponding to the data ratio. The target SIR_virtual calculating section 32 sends a transmission instruction of the target quality to the control section 35, in response to the inquiry from the target SIR calculating section 33.

The control section 35 notifies the target quality corresponding to the changed data ratio to the target SIR_virtual calculating section 32 and the target SIR calculating section 33. At this time, when the value of the target quality is changed, the control section 35 gives new measurement start timing (instructs a new measurement cycle) to the quality measuring section 31 and the target SIR_virtual calculating section 32 to reset the measurement for the radio transmission paths. When the value of the target quality is not changed, the control section 35 does not reply to the transmission instruction.

Upon reception of the new target quality and measurement cycle which are sent from the control section 35 in response to the transmission instruction of the target quality, the target SIR_virtual calculating section 32 recalculates the value indicating a target SIR_virtual according to the target quality and measurement cycle, and gives the value indicating a target SIR_virtual (the target SIR_virtual or the difference value δ) according to an operation mode, to the target SIR calculating section 33 (corresponding to S003). On the other hand, when the target quality is not changed (when the control section 35 does not reply), the target SIR_virtual calculating section 32 continues the processing performed immediately before to give the value indicating a target SIR_virtual to the target SIR calculating section 33.

Upon reception of the value indicating a target SIR_virtual corresponding to the changed target quality, the target SIR calculating section 33 receives transmission path quality relevant information corresponding to the received value from the quality measuring section 31 and calculates the target SIR for each control target radio transmission path (S004).

When the data ratio is changed, if the target quality is changed in this way, for example, the target SIR_virtual and the target SIR for each control target transmission path are calculated according to the changed target quality.

Note that the configuration can be made to perform the following operation, instead of the above-described configuration in which the quality measuring section 31 detects a change in the data ratio. Specifically, when the control section 35 detects a change in the data ratio (for example, receives a changed data distribution ratio from the data division ratio determining section 7 (FIG. 6)), the control section 35 notifies the target quality and a measurement cycle corresponding to the change in the data ratio to the respective sections, without receiving a transmission instruction from the target SIR_virtual calculating section 32. The quality measuring section 31 and the target SIR_virtual calculating section 32 reset the measurement according to the notification of the measurement cycle, and perform again measurement for each radio transmission path whose data ratio has been changed according to the new measurement cycle. The target SIR_virtual calculating section 32 notifies the value indicating a target SIR_virtual, obtained from the remeasurement results, to the target SIR calculating section 33. The target SIR calculating section 33 calculates the target SIR for each control target transmission path, based on the transmission path quality information obtained through the remeasurement and sent from the quality measuring section 31, and the value indicating a target SIR_virtual.

Application Example

Figure 24:
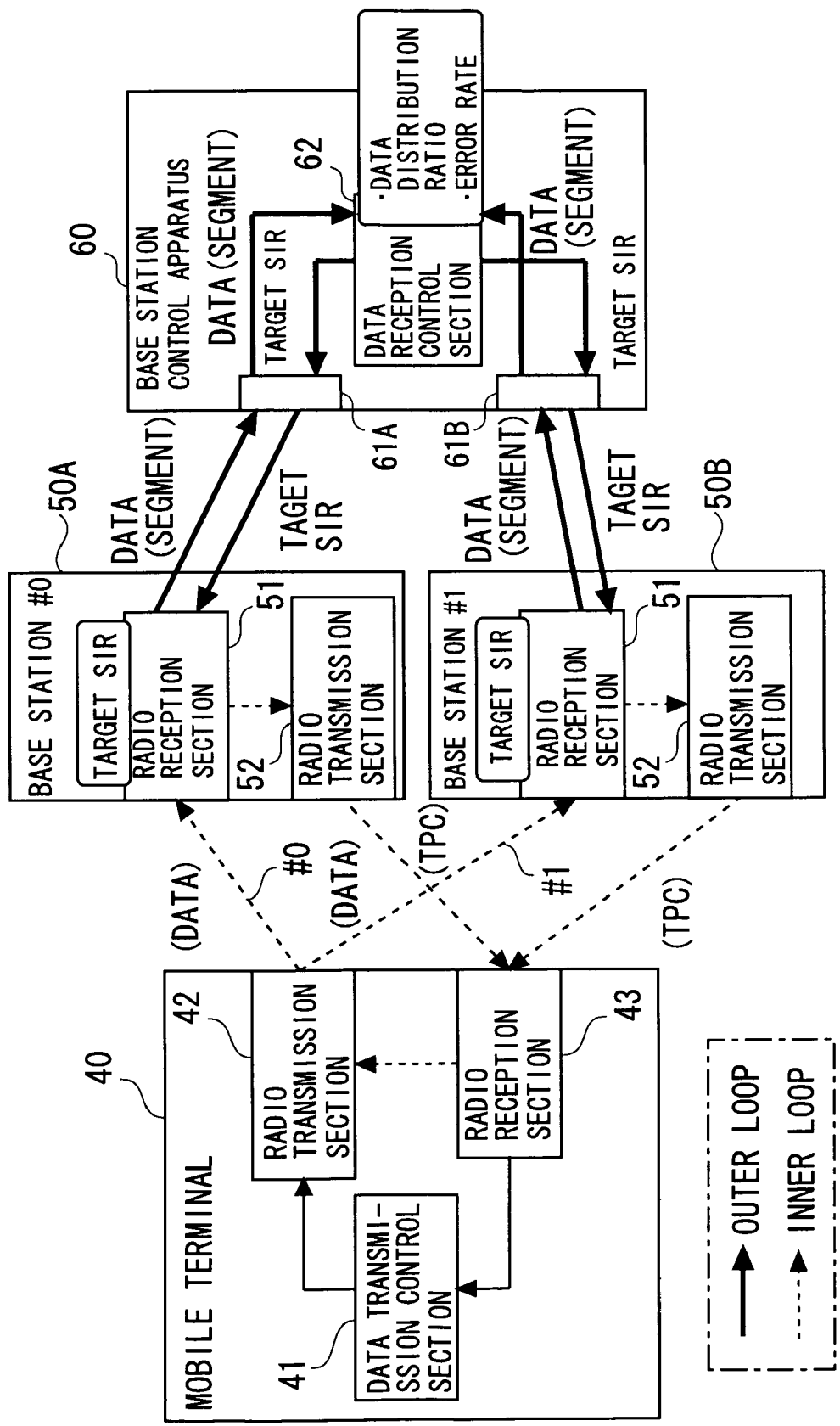
FIG. 24 is a diagram showing an application example of the embodiment.

Next, an application example of the DHO executing section 20 and the outer loop transmission power control section 30, which have been described above, will be described. FIG. 24 is a diagram showing the application example of this embodiment.

FIG. 24 shows a mobile communication system which includes a mobile terminal 40, multiple base stations 50A and 50B, and a base station control apparatus 60. The mobile terminal 40 includes a data transmission control section 41, a radio transmission section 42, and a radio reception section 43. The data transmission control section 41 has the DHO executing section.

Each of the base stations 50A and 50B includes a radio reception section 51 and a radio transmission section 52. The base station control apparatus 60 includes transmission and reception sections 61A and 61B and a data reception control section 62. The data reception control section 62 includes the DHO executing section 20 and the outer loop transmission power control section 30, as shown in FIG. 10.

<<Inner Loop Transmission Power Control>>

In the system shown in FIG. 24, multiple radio transmission paths (branches) are established in a radio section between the mobile terminal 40 and the base stations 50A and 50B. For example, when DHO is performed for data transmission in an uplink direction (from the mobile terminal to the base stations), a radio transmission path (branch) #0 is established between the mobile terminal 40 and the base station 50A, and a radio transmission path (branch) #1 is established between the mobile terminal 40 and the base station 50B. The mobile terminal 40 sends a radio signal which includes transmission target data destined for the base station control apparatus 60, to each of the radio transmission paths #0 and #1.

In the mobile communication system shown in FIG. 24, the inner loop transmission power control of the uplink-direction radio signal (radio wave) is performed as follow.

When the radio signal is received from the mobile terminal 40, the radio reception section 51 of the base station 50A measures the SIR of the radio signal and compares the measured SIR with a target SIR which has been stored in advance.

When the measured SIR is lower than the target SIR, a TPC command that instructs to increase the transmission power is generated. When the measured SIR is higher than the target SIR, a TPC command that instructs to reduce the transmission power is generated.

The TPC command is given to the radio transmission section 52. The radio transmission section 52 sends a radio signal which includes a TPC command, by using the radio transmission path for a downlink direction (from the base station to the mobile terminal) established between the base station 50A and the mobile terminal 40.

The above-described processing performed in the base station 50A is also performed in the base station 50B when the base station 50B receives the radio signal sent from the mobile terminal 40. A radio signal which includes a TPC command is sent from the base station 50B to the mobile terminal 40.

The radio reception section 43 of the mobile terminal 40 extracts the TPC command from each of the radio signals and gives the TPC command to the radio transmission section 42. The radio transmission section 42 analyses the TPC command. The radio transmission section 42 increases the transmission power of a radio signal when the TPC command instructs to increase the transmission power, and reduces the transmission power of a radio signal when the TPC command instructs to reduce the transmission power. In this way, the transmission power of radio signals sent from the mobile terminal 40 is controlled such that the transmission power is brought close to the target SIR.

<<Determination of the Occurrence of Frequency Selective Fading at Each Sub Carrier>>

In the mobile communication system shown in FIG. 24, different data can be sent from the mobile terminal 40 to the base stations 50A and 50B in transmission (uplink transmission) using the uplink-direction radio transmission paths (uplink). Therefore, the mobile communication system has the following configuration.

As a radio system applied to uplink transmission and reception performed between the mobile terminal 40 and the base stations 50A and 50B, a multicarrier radio system (for example, an OFDM or OFCDM system) in which multiple sub carriers are used is applied. In this embodiment, the OFCDM system is applied.

When the multicarrier radio system, such as the OFCDM system, is applied, the above-described inner loop transmission power control can be performed for each sub carrier.

The base stations 50A and 50B determine whether frequency selective fading has occurred at each sub carrier used for uplink transmission. For example, the base stations 50A and 50B measure the reception levels of sub carriers used in radio signals (OFCDM signals) received through the radio transmission paths #0 and #1. The base stations 50A and 50B calculate the average reception level of the multiple sub carriers for a predetermined measurement period of time. Next, the base stations 50A and 50B extract the reception level (for example, the average value) of a sub carrier that is a measurement target, and calculates the difference between this reception level and the average reception level (the difference in reception level=the average reception level−the measurement target reception level).

Next, the base stations 50A and 50B read data (for example, the reference value for a reception level) which is used to determine whether fading has occurred and is stored in advance in a storage device, and compares the reference value with the difference. When the difference is larger than the reference value (the difference in reception level>the reference value), the base stations 50A and 50B determines that fading has occurred. On the other hand, when the difference is equal to or smaller than the reference value (the difference in reception level≦the reference value), it is determined that fading has not occurred.

The base stations 50A and 50B determine for all sub carriers whether fading has occurred, and feed back the determination results to the mobile terminal 40 by using the downlink-direction radio transmission paths (downlink).

The data transmission control section 41 of the mobile terminal 40 receives the determination results (first determination results) of the sub carriers, obtained by the base stations 50A and 50B, through the radio reception section 43.

Further, the data transmission control section 41 accumulates TPC commands a predetermined number of times for each of the sub carriers being sent from the base stations 50A and 50B and received by the radio reception section 43. When the number of TPC commands that indicate increase instructions, included in the TPC commands accumulated the predetermined number of times, exceeds a predetermined value, the data transmission control section 41 determines that frequency selective fading has occurred at the sub carrier. The data transmission control section 41 performs this determination processing for all sub carriers and obtains the determination results (second determination results) of the sub carriers.

The data transmission control section 41 finally determines whether frequency selective fading has occurred at each of the sub carriers based on the first and second determination results. For example, the data transmission control section 41 calculates the logical product of the first and second determination results (for example, "0": not occurred, "1": occurred) for each of the sub carriers, and, when the calculation result shows "1", determines that fading has occurred at the sub carrier.

<<Determination and Assignment of Reception Available Sub Carriers>>

Next, the data transmission control section 41 determines sub carriers to be used by the radio transmission paths #0 and #1 based on the fading occurrence states of the sub carriers obtained through the final determination.

FIG. 25 is a diagram showing an example of fading occurrence states of multiple sub carriers (in FIG. 25, there are 16 sub carriers #0 to #15) to be used by radio transmission paths (branches) #0 and #1 and determination and assignment states of the sub carriers to be used by the branches #0 and #1.

FIG. 25 shows the fading occurrence states of the sub carriers #0 to #15 based on the above-described fading occurrence determination results. In the branch #0, fading has occurred at the sub carriers #11 and #13. In the branch #1, fading has occurred at the sub carriers #2 and #5.

The data transmission control section 41 determines sub carriers (reception available sub carriers) to be used by the branches, according to the occurrence states such that a sub carrier at which fading has occurred is not assigned to the branches, for example.

In the example shown in FIG. 25, the sub carrier numbers #0 to #7 are determined to be used by the branch #0, and those sub carriers are assigned to the branch #0. On the other hand, the sub carrier numbers #8 to #15 are determined to be used by the branch #1, and those sub carriers are assigned to the branch #1. This sub carrier assignment results (reception available sub carriers) are notified from the mobile terminal 40 to the base stations 50A and 50B. With this notification, the base stations 50A and 50B recognize the reception available sub carriers to be used for their uplink reception.

Through the above-described determination and assignment of reception available sub carriers, the sub carrier use ratios of the radio transmission paths are determined. In the example shown in FIG. 25, the use ratios of the radio transmission paths #0 and #1 are 0.5. The data transmission control section 41 can determine the use ratios of sub carriers of the radio transmission paths by using the frequency selective fading occurrence states as quality information of each of the radio transmission paths.

<<Uplink Transmission>>

Figure 26:
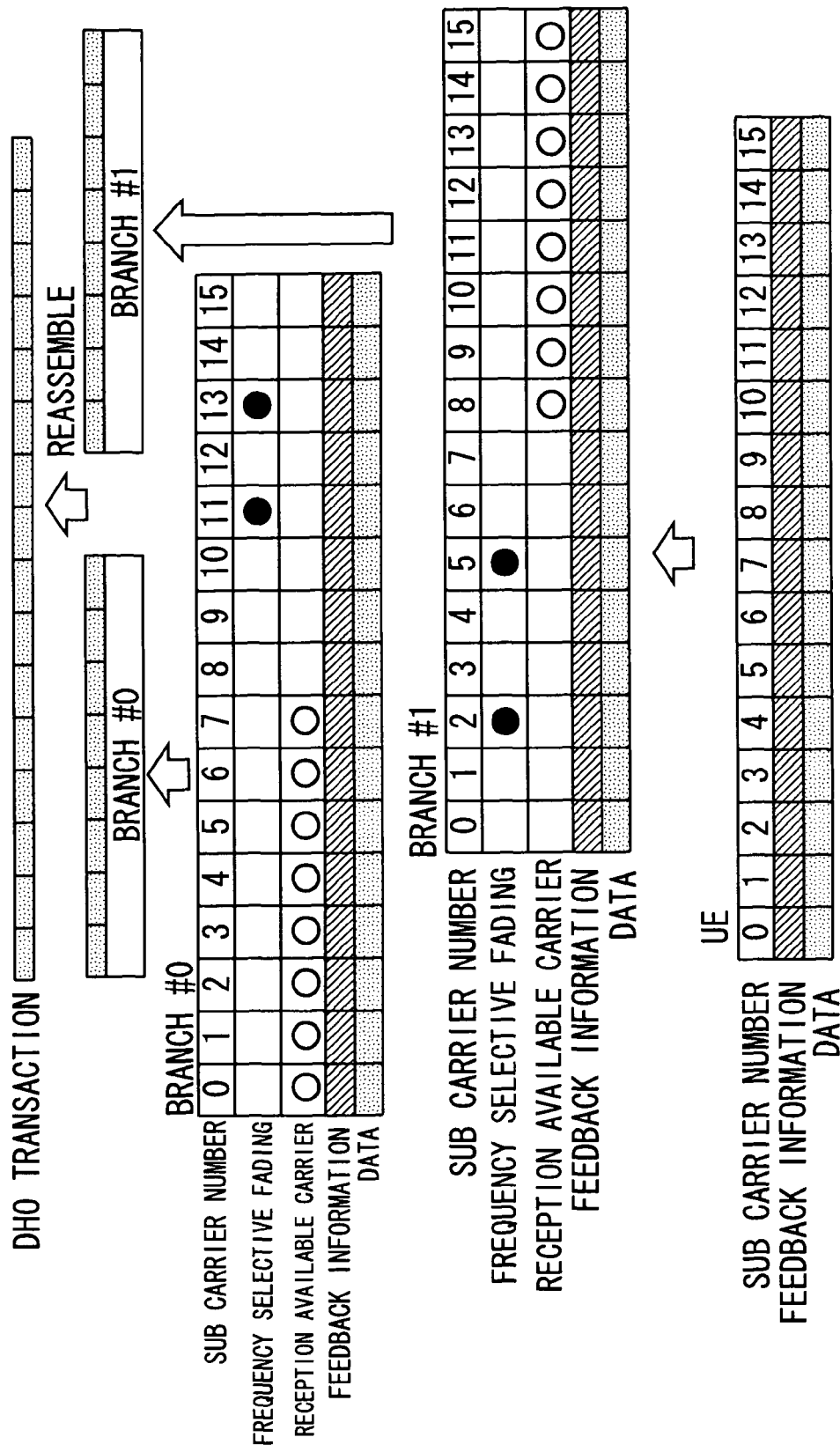
FIG. 26 is an explanatory diagram of uplink transmission performed in the application example shown in FIG. 24.

When DHO is performed, the mobile terminal 40 performs uplink transmission of transmission target data to the base station control apparatus 60 through the base stations 50A and 50B (by using the multiple radio transmission paths #0 and #1). FIG. 26 is an explanatory diagram of uplink transmission.

In FIG. 24, the data transmission control section 41 of the mobile terminal (UE) gives the transmission target data destined for the base station control apparatus 60, to the radio transmission section 42. The radio transmission section 42 converts the transmission target data into an OFCDM signal according to the OFCDM system, and sends the OFCDM signal to the radio transmission paths #0 and #1.

In the base station 50A, the radio reception section 51 receives the OFCDM signal from the radio transmission path #0 and performs demodulation processing to the OFCDM signal. The base station 50A has been notified in advance that the sub carrier numbers #0 to #7 are reception available sub carriers. Therefore, the radio reception section 51 regards the sub carrier numbers #0 to #7 included in the OFCDM signal as reception targets, and performs the demodulation processing to data received with the sub carriers #0 to #7 to reproduce the data. Accordingly, parts (segments) of the data sent from the mobile terminal 40 are generated.

Similarly, in the base station 50B, the radio reception section 51 receives the OFCDM signal from the radio transmission path #1 and performs demodulation processing to the OFCDM signal. The base station 50B has been notified in advance that the sub carrier numbers #8 to #15 are reception available sub carriers. Therefore, the radio reception section 51 regards the sub carrier numbers #8 to #15 included in the OFCDM signal as reception targets, and performs the demodulation processing to data received with the sub carriers #8 to #15 to reproduce the data. Accordingly, parts (segments) of the data sent from the mobile terminal 40 are generated. The base stations 50A and 50B send the reproduced segments to the base station control apparatus 60.

As described above, when the base stations 50A and 50B perform reception processing for their reception available sub carriers, the mobile terminal 40 substantially divides the transmission target data to send them to the radio transmission paths #0 and #1.

In the base station control apparatus 60, the transmission and reception sections 61A and 61B receive the segments sent from the base stations 50A and 50B, respectively, and give the segments to the data reception control section 62.

<<Outer Loop Transmission Power Control>>

The data reception control section 62 includes the DHO executing section 20 and the outer loop transmission power control section 30, as described above. The data reception control section 62 calculates the above-described value indicating a target SIR_virtual, and the target SIRs for the radio transmission paths #0 and #1 (when the radio transmission paths #0 and #1 are set to control targets), based on the quality information (the data amount and the error rate) of the transmission target data obtained by reassembling the segments, and the transmission path quality relevant information (the data ratio and the error rate) of each of the radio transmission paths #0 and #1, and outputs frames which include the target SIRs.

For example, when the radio transmission paths #0 and #1 are determined to be control target transmission paths, the frames which include the target SIRs corresponding to the radio transmission paths are notified to the radio reception sections 51 of the base stations 50A and 50B through the transmission and reception sections 61A and 61B, respectively. The radio reception sections 51 use the target SIRs included in the frames to update the current target SIRs. As a result, it is possible to reduce the error rates of the radio transmission paths #0 and #1 and to suppress wasteful use of the transmission power of the mobile terminal 40.

In the above-described processing, before transmitting the transmission target data, the mobile terminal 40 divides the transmission target data according to the reception available sub carrier use ratios and attaches CRC data to each piece of division data (segment), for example. The CRC data, attached to each segment, is sent to the corresponding base station by using the reception available sub carrier. With the CRC data, the data reception control section 62 of the base station control apparatus 60 can perform CRC calculation for each segment and obtain the radio transmission path quality information (the transmission path quality relevant information) of each of the radio transmission paths #0 and #1, the information being the error rate of each segment.

However, when an assignment result of reception available sub carriers (sub carrier use ratios or fading occurrence states) or quality information of control data is used instead of the error rate of the segment, as the radio transmission path quality information, the above-described attachment of the CRC data to the segments can be omitted.

Further, in the above-described processing, the mobile terminal 40 sends identical data (OFCDM signal) to the radio transmission paths #0 and #1. Instead of this configuration, the mobile terminal 40 may send two OFCDM signals in each of which no data is included in sub carriers that are not used as reception available sub carriers.

Note that the determination of the occurrence of frequency selective fading at each sub carrier, the determination and assignment of reception available sub carriers, and the uplink transmission, which have been described above, are disclosed in a patent application titled "mobile terminal and base station device" (Application number: PCT/JP2005/015478, Filing date: Aug. 25, 2005, Not published) which has already been filed by the inventor(s) of the present application.

Further, in the mobile communication system shown in FIG. 24, when the base station control apparatus 60 divides the transmission target data into two segments corresponding to the radio transmission paths #0 and #1 and sends the segments to the mobile terminal 40 through the base stations 50A and 50B while performing DHO, it is conceivable that the inner loop transmission power control is performed for downlink (the downlink-direction radio transmission paths) from the base stations 50A and 50B to the mobile terminal 40 and the mobile terminal 40 holds target SIRs used to control the radio transmission paths.

In this case, the mobile terminal 40 can be configured to have the same configuration as the data reception control section 62 of the base station control apparatus 60 shown in FIG. 24, calculate the target SIR_virtual and the target SIRs for the radio transmission paths by using segments received through the downlink-direction radio transmission paths and transmission target data obtained by combining the segments, and update the current target SIRs.

Effects of the Embodiment

According to the embodiment described above, it is possible to suppress an unnecessary power increase instruction issued to a radio transmission path that has a low degree of contribution to DHO. On the other hand, a radio transmission path that has a high degree of contribution to DHO is actively used to effectively use the radio resources.

<Others>

The disclosures of international application PCT/JP2005/017414 filed on Sep. 21, 2005 including the specification, drawings and abstract are incorporated herein by reference.

What is claimed is:

1. A transmission power control target value calculating apparatus that calculates target values, which are used for transmission power control of radio waves sent through a plurality of radio transmission paths, comprising:
   a first target value calculating section that calculates a first transmission power control target value which corresponds to combined data which is obtained by combining data obtained through the plurality of radio transmission paths, based on quality of the combined data; and
   a second target value calculating section that calculates a plurality of second transmission power control target values, each of which is applied to each of the plurality of radio transmission paths, respectively,
   wherein each of the second transmission power control target values, each of which corresponds to each of the plurality of radio transmission paths, is calculated based on the first transmission power control target value and quality information of data obtained through the corresponding radio transmission path before being combined into the combined data, respectively, wherein the first transmission power control target value is a virtual transmission power control target value which is not applied to any one of the plurality of radio transmission paths in an inner loop transmission power control.

2. The transmission power control target value calculating apparatus according to claim 1, wherein the first target value calculating section holds a target value for the quality of the combined data, compares the quality of the combined data with the target value for the quality of the combined data, calculates the first transmission power control target value to increase transmission power when the quality of the combined data is larger than the target value for the quality of the combined data, and calculates the first transmission power control target value to reduce the transmission power when the quality of the combined data is smaller than the target value for the quality of the combined data.

3. The transmission power control target value calculating apparatus according to claim 1, wherein:
   the second target value calculating section calculates the plurality of second transmission power control target values when a notification is received from the first target value calculating section; and
   the first target value calculating section stores the preceding first transmission power control target value which is calculated last, obtains, when a new first transmission power control target value is calculated, a difference between the preceding first transmission power control target value and the new first transmission power control target value, and sends, when the difference is obtained, the notification of the difference.

4. The transmission power control target value calculating apparatus according to claim 1, wherein the second target value calculating section holds target quality, compares the quality information of each of the plurality of radio transmission paths with the target quality when a value indicating the first transmission power control target value is notified from the first target value calculating section, and excludes, when the value indicating the first transmission power control target value indicates an increase in the transmission power, a radio transmission path whose quality information is higher than the target quality, from targets for which the plurality of second transmission power control target values are to be calculated.

5. The transmission power control target value calculating apparatus according to claim 1, wherein the second target value calculating section holds target quality, compares the quality information of each of the plurality of radio transmission paths with the target quality when a value indicating the first transmission power control target value is notified from the first target value calculating section, and excludes, when the value indicating the first transmission power control target value indicates a reduction in the transmission power, a radio transmission path whose quality information is lower than the target quality, from targets for which the plurality of second transmission power control target values are to be calculated.

6. The transmission power control target value calculating apparatus according to claim 1, wherein the second target value calculating section holds target quality and an upper limit quality value, compares the quality information of each of the plurality of radio transmission paths with the target quality and the upper limit quality value when a value indicating the first transmission power control target value is received from the first target value calculating section, and excludes, when the value indicating the first transmission power control target value indicates an increase in the transmission power, a radio transmission path whose quality information is higher than the target quality and the upper limit quality value from targets for which the plurality of second transmission power control target values are to be calculated.

7. The transmission power control target value calculating apparatus according to claim 1, wherein the second target value calculating section holds target quality and a lower limit quality value, compares the quality information of each of the plurality of radio transmission paths with the target quality and the lower limit quality value when a value indicating the first transmission power control target value is received from the first target value calculating section, and excludes, when the value indicating the first transmission power control target value indicates a reduction in the transmission power, a radio transmission path whose quality information is lower than the target quality and the lower limit quality value from targets for which the plurality of second transmission power control target values are to be calculated.

8. The transmission power control target value calculating apparatus according to claim 1, wherein the second target value calculating section holds target quality, compares the target quality with the quality information of each of the plurality of radio transmission paths when a notification is received from the first target value calculating section; excludes a radio transmission path whose quality information indicates the same value as the quality of the combined data, from targets for which the plurality of second transmission power control target values are to be calculated; and calculates a new second transmission power control target value which is obtained by increasing or reducing, by a predetermined amount, the second transmission power control target value that is currently used for the transmission power control, for at least one of the plurality of radio transmission paths whose quality information does not indicate the same value as the quality of the combined data.

9. The transmission power control target value calculating apparatus according to claim 1, wherein, when a value indicating the first transmission power control target value is notified from the first target value calculating section, the second target value calculating section determines, based on the quality information of each of the plurality of radio transmission paths that are targets for which the plurality of second transmission power control target values are to be calculated, a plurality of allocation amounts of the value indicating the first transmission power control target value to the plurality of target radio transmission paths, wherein each of the plurality of allocation amounts corresponds to each of the plurality of target radio transmission paths.

10. The transmission power control target value calculating apparatus according to claim 9, wherein the second target value calculating section calculates a plurality of weights Rs ($0 \leq R \leq 1$) for the plurality of target radio transmission paths based on the quality information of each of the plurality of target radio transmission paths, and multiplies the value indicating the first transmission power control target value by each of the plurality of weights Rs to determine each of the plurality of allocation amounts of the value indicating the first transmission power control target value to the plurality of target radio transmission paths, wherein each of the plurality of weights Rs corresponds to each of the plurality of target radio transmission paths.

11. The transmission power control target value calculating apparatus according to claim 9, wherein the second target value calculating section adds a predetermined value to each of the determined allocation amounts.

12. The transmission power control target value calculating apparatus according to claim 9, wherein:
the value indicating the first transmission power control target value is the first transmission power control target value; and
the second target value calculating section calculates each of the plurality of allocation amounts of the first transmission power control target value to each of the plurality of target radio transmission paths, as the second transmission power control target value to be applied to each of the plurality of target radio transmission paths.

13. The transmission power control target value calculating apparatus according to claim 9, wherein:
the first target value calculating section calculates the first transmission power control target value at intervals of a predetermined measurement cycle;
the value indicating the first transmission power control target value is a difference value between a first transmission power control target value calculated in the preceding measurement cycle and a first transmission power control target value calculated in the current measurement cycle; and
the second target value calculating section calculates a plurality of allocation amounts of the difference value to the plurality of target radio transmission paths, as update amounts of the plurality of second transmission power control target values, each of which currently used for each of the plurality of target radio transmission paths, wherein each of the plurality of allocation amounts of the difference value corresponds to each of the plurality of target radio transmission paths.

14. The transmission power control target value calculating apparatus according to claim 1, wherein:
the quality of the combined data comprises an error rate of the combined data; and
the quality information of each of the plurality of radio transmission paths comprises an error rate of data obtained through each of the plurality of radio transmission paths.

15. The transmission power control target value calculating apparatus according to claim 1, wherein the second target value calculating section performs calculation processing of the plurality of second transmission power control target values when a ratio of data obtained through each of the radio transmission paths is changed.

16. A transmission power control target value calculating method performed by an information processor that calculates target values, which are used for transmission power control of radio waves sent through a plurality of radio transmission paths, the method comprising:
calculating a first transmission power control target value which corresponds to combined data which is obtained by combining data obtained through the plurality of radio transmission paths, based on quality of the combined data; and
calculating a plurality of second transmission power control target values, each of which is applied to each of the plurality of radio transmission paths, respectively,
wherein each of the second transmission power control target values, each of which corresponds to each of the plurality of radio transmission paths, is calculated based on the first transmission power control target value and quality information of data obtained through the corresponding radio transmission path before being combined into the combined data, respectively, wherein the first transmission power control target value is a virtual transmission power control target value which is not applied to any one of the plurality of radio transmission paths in an inner loop transmission power control.

* * * * *